United States Patent [19]
Hiraga et al.

[11] 3,903,471
[45] Sept. 2, 1975

[54] ELECTRONIC CIRCUIT TEST EQUIPMENT INCLUDING A CATHODE RAY TUBE DETACHABLY CONNECTED THERETO USING A PLURALITY OF INFORMATION SIGNALS

[75] Inventors: Ryozo Hiraga, Yokohama; Shin Tsuda, Hasuda-machi, both of Japan

[73] Assignee: Canon Kabushiki Kaisha, Tokyo, Japan

[22] Filed: Mar. 8, 1973

[21] Appl. No.: 339,354

[30] Foreign Application Priority Data
Mar. 10, 1972 Japan.............................. 47-25017
Mar. 17, 1972 Japan.............................. 47-32433

[52] U.S. Cl............. 324/133; 324/72.5; 307/235 R; 331/49; 340/248 D
[51] Int. Cl.².................. G01R 19/16; G01R 31/02
[58] Field of Search.............. 324/51, 72.5, 133, 73, 324/121 R; 328/110; 307/235, 242, 247; 331/49, 179; 340/248 A, 248 B, 248 C, 248 D

[56] References Cited
UNITED STATES PATENTS

| | | | |
|---|---|---|---|
| 2,437,876 | 3/1948 | Cohn | 340/248 D X |
| 2,457,288 | 12/1948 | Usselman | 331/49 X |
| 2,591,738 | 4/1952 | Spencer | 324/121 R X |
| 2,946,001 | 7/1960 | Russell | 324/72.5 X |
| 3,021,514 | 2/1962 | Regis et al. | 324/133 X |
| 3,122,729 | 2/1964 | Bothwell et al. | 340/248 |
| 3,207,995 | 9/1965 | Beer et al. | 331/49 X |
| 3,336,536 | 8/1967 | Dame | 331/179 X |
| 3,619,775 | 11/1971 | Naylor | 324/133 X |
| 3,628,141 | 12/1971 | Union et al. | 324/72.5 |
| 3,704,411 | 11/1972 | Jamieson | 324/53 |
| 3,742,351 | 6/1973 | Palmer et al. | 324/133 X |

*Primary Examiner*—Gerard R. Strecker
*Attorney, Agent, or Firm*—Fitzpatrick, Cella, Harper & Scinto

[57] ABSTRACT

Test equipment for logic circuit in disclosed which includes attachment. The attachment comprises signal level detector, oscillators operated in accordance with the signal level and acoustic transducer thereby to acoustically indicate the electrical condition of the circuit. The attachment can also be effected to optically indicate the circuit condition.

34 Claims, 31 Drawing Figures

3,903,471

PATENTED SEP 2 1975  3,903,471

SHEET 3

PATENTED SEP 2 1975 3,903,471

SHEET 5

ELECTRONIC CIRCUIT TEST EQUIPMENT INCLUDING A CATHODE RAY TUBE DETACHABLY CONNECTED THERETO USING A PLURALITY OF INFORMATION SIGNALS

BACKGROUND OF THE INVENTION

1. Field of the Invention

The present invention relates to generally a logic circuit test equipment and more particularly a logic circuit test equipment for converting the voltage levels, a single pulse and a pulse train detected into the audio or sound and/or video or visual signals so that the general electrical condition of a circuit under test may be detected, the logic circuit test equipment being also adapted to be used in conjunction with an ordinary type oscilloscope.

2. Description of the Prior Art

In general the circuit testers and oscilloscopes have been used in order to test microelectronic equipment consisting of integrated circuits and the like which have been more and more miniaturized, but they have a common defect that a probe is separated from a display device for displaying the result of a test so that first an inspector must make the probe into contact with a point to be checked of a circuit under test and then observe the display device which displays the waveform of the detected voltage or current. Therefore the inspector must turn his eyes away from the point to be checked with which is contacted the probe in order to observe the waveform displayed by the display device so that there is a fear that the probe is disconnected from the point to be checked when he is observing the waveform. Therefore he must repeat the tests many times, and in the worst case the probe displaced away from the check point will cause the short-circuit of the circuit under test.

In the test of the digital integrated circuits or ICs the tests for checking whether the voltage level of a circuit under test is in a binary state 1 or high or 0 or low are more frequently required than the tests for checking the waveform and period of the pulses or pulse train. When the oscilloscopes are used in testing the logic or voltage level of a circuit, an inspector must turn his eyes away from the circuit under test to observe the waveform displayed on the oscilloscope so that the testing precedure is very inefficient. To overcome this problem there has been proposed a logic checker especially designed for a specific logic circuit, but it is not satisfactory in practice because it cannot measure the period of pulses, the detailed waveform, the crest value, and so on.

SUMMARY OF THE INVENTION

One of the objects of the present invention is therefore to provide a logic circuit test equipment whereby the general condition of a circuit under test may be detected by the sound and/or light signals without an inspector turning his eyes away from a check point in the circuit under test and the waveform may be observed in detail by an oscilloscope or the like. Therefore the efficiency of the testing procedure may be much improved.

A logic circuit test equipment in accordance with the present invention is provided with plugs or the like for electrical connection with an ordinary type oscilloscope or the like and also with a receptacle or the like, if required, for receiving a plug extending from the output terminal of a conventional probe so that the logic circuit test equipment may be inserted between the probe and the oscilloscope as an attachment. Therefore the logic circuit test equipment of the present invention will not adversely affect the observation of the oscilloscope and the testing procedure may be much facilitated.

According to the present invention attachment incorporating a circuit for detecting the voltage level of a circuit under test is used with a conventional oscilloscope without modifying the latter so that the general condition of the circuit may be detected or tested without the inspector turning his eyes away from the oscilloscope for observing the waveform in detail. Furthermore the test may be accomplished only by the attachment even when it is electrically connected to the oscilloscope.

In general a digital circuit is possible to be only either a binary state 1 or 0 or at high or low level. For example the high level of a circuit with a power source voltage of 5 V is about 5 V and the low level is about 0 – 1 V. Therefore according to the present invention when a circuit under test is at a high level or when a high voltage is impressed to a probe which is made into contact with a check point of a circuit under test, an oscillator is energized so that the sound signal with a predetermined frequency may be heared through an electroacoustic transducer, but when a low level is detected, the sound signal with a frequency different from that of the sound indicating the high level is heard. When the probe is floating or when it is out of contact with a circuit under test, no sound signal is heard. Therefore the general condition of a circuit under test may be immediately detected without observing the oscilloscope. Moreover according to the present invention the probe may be provided with display means such as electroluminescent diodes, liquid crystal or the like which flashes when a high- or low-level is detected so that the inspector may detect the general condition of a circuit under test without turning his eyes away from the oscilloscope.

BRIEF DESCRIPTION OF THE DRAWINGS

The above other objects, features and advantages of the present invention will become more apparent from the following description of preferred embodiments thereof taken in conjunction with the accompanying drawing in which:-

DESCRIPTION OF THE PREFERRED EMBODIMENTS

Figure 1:
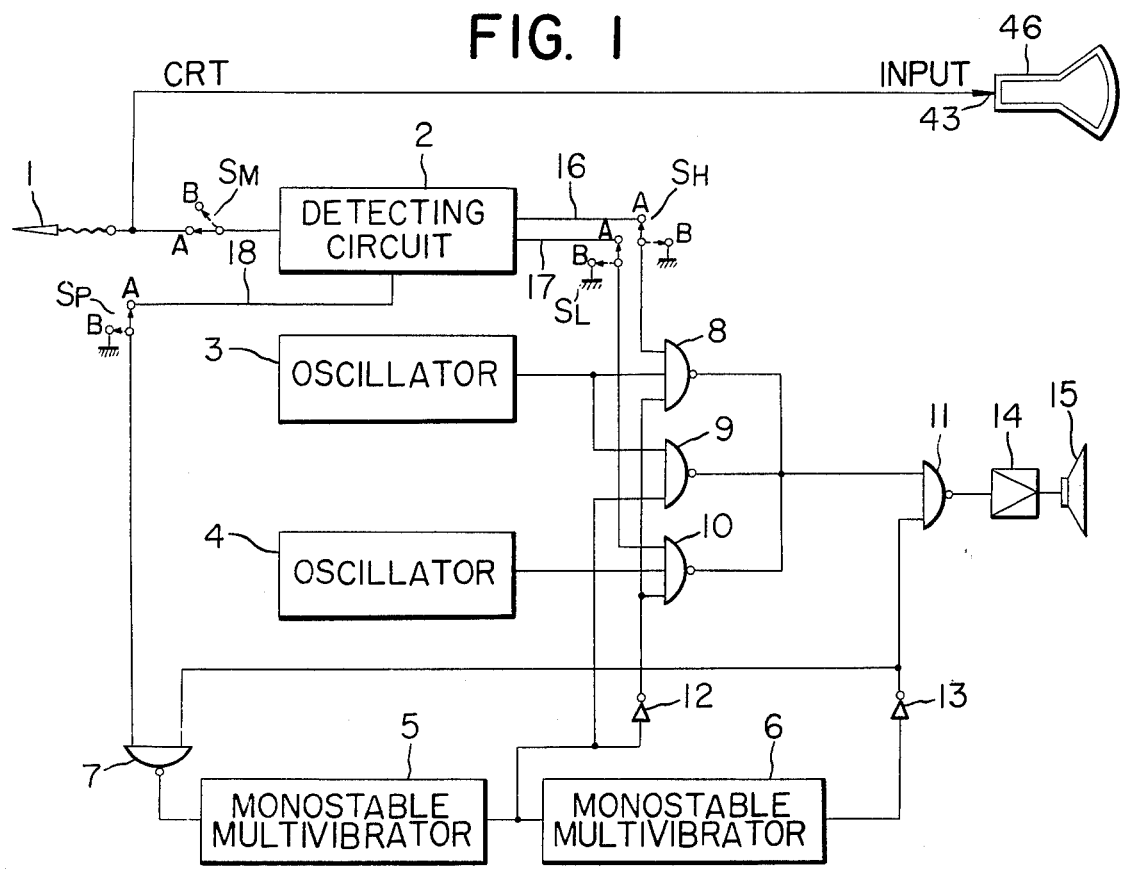
FIGS. 1 and 2 are circuit diagrams of a first and second embodiments of an attachment of a logic circuit test equipment in accordance with the present invention.

Attachment, FIG. 1

First referring to FIG. 1 illustrating one embodiment of an attachment stage, reference numeral 1 denotes a probe for detecting a voltage of a circuit under test; 2, a detecting circuit for detecting whether the voltage of the circuit under test is at a high or low level or pulse; 3 and 4, oscillators with the oscillation frequencies $f_1$ and $f_2$ (Hz) within the audible frequency range; 5 and 6, monostable multivibrators, the former being triggered in response to a single-shot pulse and the latter being trigger in response to the fall of the triggering pulse applied to the former; 7–11, NAND circuits; 12 and 13, inverters; 14, an amplifier or impedance converter; 15, an electroacoustic transducer; and $S_M$, $S_H$, $S_L$ and $S_P$, manual audio frequency selecting means such as manual switches connected to a terminal A.

Next the mode of operation will be described. When the circuit under test is at high voltage level, the output signal of the detecting circuit 2 is transmitted on a signal line 16 to the NAND circuit 8 through the switch $S_H$. Because the output of the oscillator 3 and the output of the inventer 12, that is output of the monostable multivibrator 5 inverted by the inverter 12 (a high level voltage) are applied to the NAND circuit 8, the latter is opened when the output signal of the detecting circuit 2 is applied thereto so that the output of the oscillator 3 may be applied to the NAND circuit 11 to which is also applied the negated output signal of the monostable multivibrator 6 which is inverted by the inverter 13. As a result, the output of the oscillator 3 is amplified or impedance-converted by the amplifier or impedance converter 14 so that the operator may hear the sound signal with the frequency of the oscillator 3 through the electroacoustic transducer 15. Therefore the operator may know that the circuit under test is at a high voltage level.

When the voltage level of the circuit under test is low, the output signal of the detecting circuit 2 is transmitted on a signal line 17 to the NAND circuit 10 so that the latter is opened in a manner substantially similar to that described above. Therefore the output of the oscillator 4 is applied to the electroacoustic transducer 15 so that the operator may hear the sound signal with the low frequency $f_2$. Therefore he may know that the circuit under test is at low level.

Next referring to FIG. 3A the mode of detecting a single positive pulse generated by the circuit under test will be described. When the circuit under test is detected by the probe, the sound with a low frequency $f_2$ is heard because the circuit under test is at a low level, but when a single pulse is generated after a time $t_1$, the circuit under test is at a high level so that the NAND circuit 8 is opened and the sound with a high frequency $f_1$ is heard. When the single pulse disappears at a time $t_2$, the monostable multivibrator 5 is turned on and the high-level output of the multivibrator 5 is inverted by the inverter 12 and applied to the NAND circuits 8 and 10 so that they are closed. At the same time the NAND circuit 9 is opened so that the sound with a higher frequency $f_1$ of the oscillator 3 is heard. At a time $t_3$ which is dependent of the time constant of the multivibrator 5, the output thereof changes from a high level to a low level so that the NAND circuit 9 is closed whereas the NAND circuits 8 and 10 are opened. When the multivibrator 5 is turned off the monostable multivibrator 6 is triggered and the high-level output thereof is inverted by the inverter 13 and is applied to the NAND circuit 11 so that the latter is closed. During the NAND circuit is closed, that is during when the output of the multivibrator 6 is at a high level no sound is heard. At a time $t_4$ which is dependent upon the time constant of the multivibrator 6, the output thereof falls so that the sound with a frequency $f_2$ of the oscillator 4 is heard again. Thus the positive or high-level pulse is detected.

Next referring to FIG. 3B the mode of detection of a negative or low-level pulse generated by a circuit under test will be described.

Since the initial condition is that the output of the circuit under test is at high level, the output of the oscillator 3 passes through the NAND circuits 8 and 11 so that the sound with the frequency $f_1$ may be heard. At a time $t_1$ when a negative or low-level pulse arrives, the output of the monostable multivibrator 5 reaches a high level. Therefore the NAND circuit 9 is opened whereas the NAND circuits 8 and 10 are closed so that the sound with the frequency $f_1$ of the oscillator 3 is heard as long as the output of the multivibrator 5 remains at a high level. At a time $t_2$ which is dependent upon a time constant of the multivibrator 5, the output thereof rises from a low level to a high level so that the monostable multivibrator 6 is triggered giving a high level output. In this case the NAND circuits 8 and 10 are opened whereas the NAND circuit 9 is opened.

The high-level output of the monostable multivibrator 6 which is inverted by the inverter 13 is applied to the NAND circuit 11 so that the latter is closed and no sound is heard. When the multivibrator 6 is turned off at a time $t_4$, the NAND circuit 11 is opened so that the sound with the low frequency of the oscillator 3 is heard again. Thus the detection of the low-level or negative pulse is accomplished.

As described above the period of the monostable multivibrator is utilized in the measurement of a single pulse so that the operator may distinctly distinguish between the two sound signals.

Next referring to FIG. 3C the mode of detecting a pulse train will be described. The first pulse is applied from the detecting circuit 2 to the NAND circuit 7 through the output line 18 and the switch $S_p$, and the monostable multivibrator 5 is triggered at a time $t_2$ when the first pulse falls. In response to the high-level output of the monostable multivibrator 5, the NAND circuit 9 is opened but the NAND circuits 8 and 10 are closed. Therefore the sound with the high frequency $f_1$ of the oscillator 3 is heard as long as the multivibrator 5 is turned on.

In response to the fall of the output signal of the multivibrator 5 at a time $t_2$, the multivibrator 6 is triggered giving a high-level output. Then the NAND circuit 11 is closed so that no sound is heard as long as the monostable multivibrator 6 is turned on. The output of the inverter 13 which closes the NAND circuit 11 is also applied to one of the input terminals of the NAND circuit 7 so that the pulses are not applied to the monostable multivibrator 5. In other words as long as the output of the monostable multivibrator 6 is at high level and NAND circuti 7 is closed so that the monostable multivibrator 5 is not triggered.

When the high-level output of the monostable multivibrator 6 falls to a low level at a time $t_4$ which is dependent upon the time constant of the multivibrator 6, the attachment circuit returns to its initial condition so that the NAND circuits 7 and 11 are opened. Then in response to the fall of the next pulse to be applied to the monostable multivibrator 5 the latter is triggered again and the above described operation is cycled. Thus the operator may detect the pulse train from the intermittently generated sound signals with the frequency $f_1$ of the oscillator 3. The pattern of change in frequency of the sound signals is shown at $T_1$ in FIG. 3, but it may be varied as will be described in more detail hereinafter.

Figure 2:
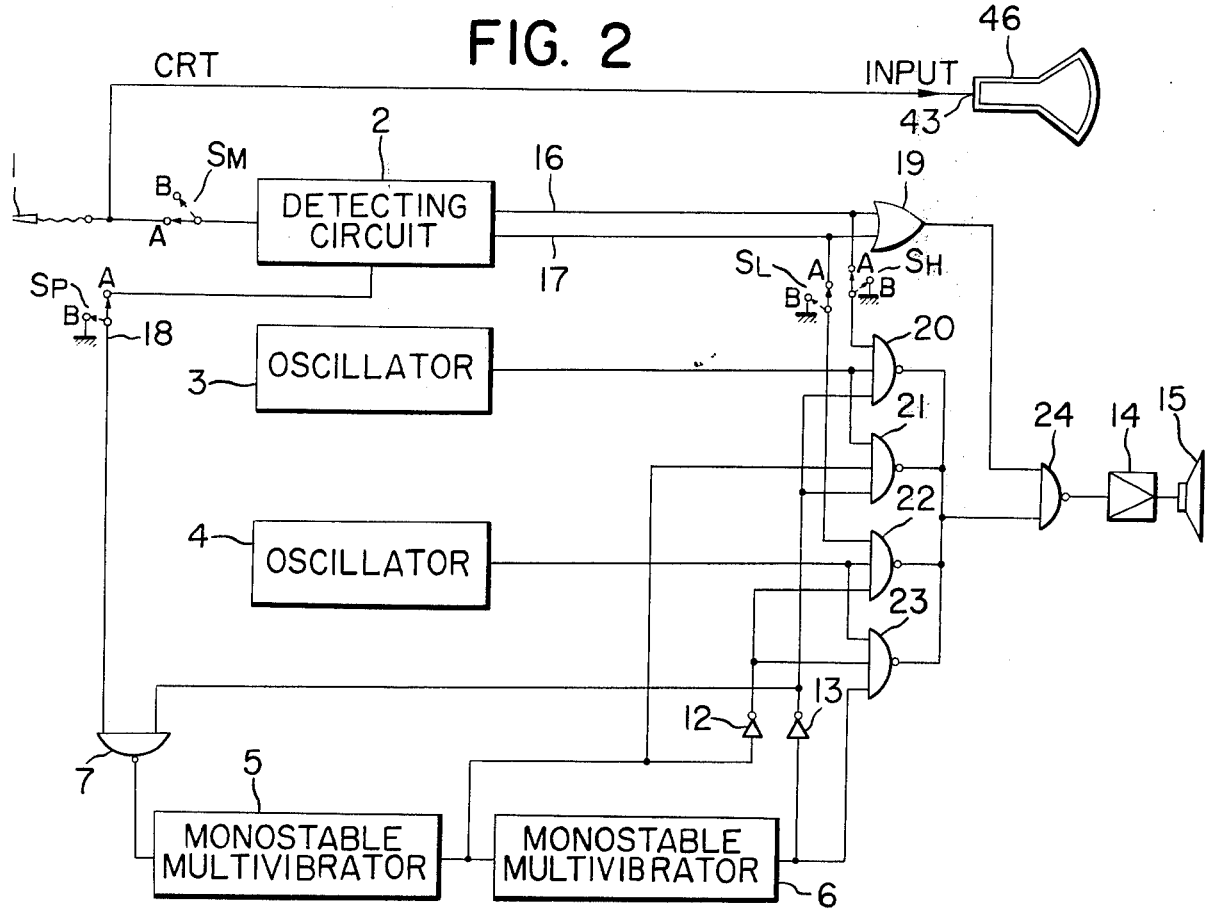

Attachment, FIGS. 2 and 3

Another embodiment of the attachment will be described with reference to FIGS. 2 and 3 in which same reference numerals are used to designate component parts similar to those shown in FIG. 1 When a high-level signal is detected the sound with the frequency $f_1$ of the oscillator 3 is heard, but when a low-level signal is detected, the sound with the frequency $f_2$ of the oscillator 4 is heard.

Figure 3A:
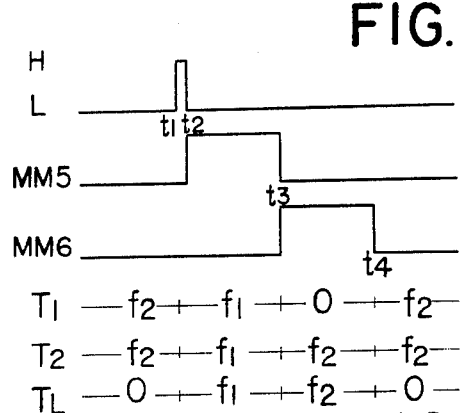
FIGS. 3A–3D are views used for the explanation of the modes of operation thereof.
Figure 3C:
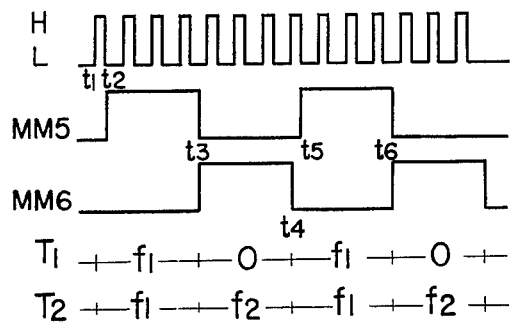
Figure 3B:
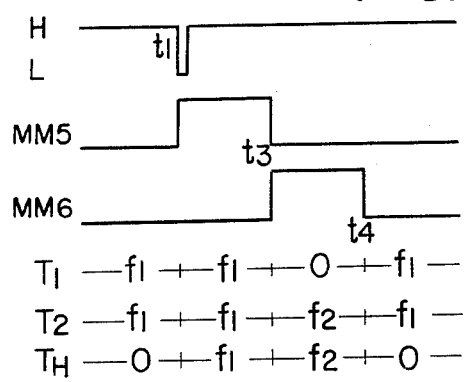

When a positive or high-level single pulse signal as shown in FIG. 3A is detected, the monostable multivibrator 5 is triggered and a NAND circuit 21 is opened so that the sound with the frequency $f_1$ of the oscillator 3 is heard as long as the monostable multivibrator 5 is turned on, but when the multivibrator 5 is turned off and the monostable multivibrator 6 is turned on a NAND circuit 23 is opened so that the sound with the frequency $f_2$ may be heard. The sound with the frequency $f_2$ continues because the circuit under test remains at a low level. Thus the operator may detect a single pulse. The pattern of change in frequency of sound signals is shown at $T_2$ in FIG. 3A. As shown at $T_2$ in FIGS. 3B and 3C the sound with the frequency $f_1$ is heard as long as the monostable multivibrator 5 is turned on and the sound with the frequency $f_2$ is heard as long as the monostable multivibrator 6 is turned on.

As long as the probe 1 is in contact with a circuit under test, an OR circuit 19 passes either of the high-level or low-level signal to a NAND circuit 24. Therefore as long as the probe 1 is made into contact with a circuit under test, the NAND circuit 24 is ready to open to pass the outputs of NAND circuits 20–23. If the circuit under test is at a high level immediately before the probe 1 is disconnected therefrom, the signal applied to the monostable multivibrator 5 falls when the probe 1 is disconnected so that the multivibrator 5 is triggered and then the monostable multivibrator 6 is triggered. Therefore the sound with the frequency $f_1$ is heard first and then the sound with the frequency $f_2$ is heard. In order to prevent the sound signals from being produced when the probe 1 is disconnected from a circuit under test, the output of the OR gate 19 is applied to the NAND circuit 24. That is, as soon as the probe 1 is disconnected from the circuit under test, the output of the OR gate 19 disappears so that the NAND circuit 24 is closed so as to prevent the sound signal from being produced. The OR gate 19 may be also inserted into the attachment shown in FIG. 1.

Next the method for testing a circuit which remains at a high or low level for a relatively long time will be described. When it is desired to check if the circuit under test which remains in a steady state at a certain level generates noise pulses or to check if the level varies, the operator must keep hearing the sound with a predetermined frequency for a relatively long time. This cumbersome method will hasten the fatigue of the operator. This defect may be solved by a switching means which is adapted to stop the sound or control the volume of the sound to a desired level so that the operator may only wait until the noise due to noise pulses is produced. Thus the test may be accomplished in a very efficient manner without causing the fatigue of the operator. In FIGS. 1 and 2, the manual switches $S_H$, $S_L$ and $S_F$ for eliminating the sound signal are provided. As will be described in more detail hereinafter these switches may be also used to control the volume of the sound or to switch the sound signal to suitable background music. The switch $S_M$ is connected to a terminal B when a circuit is desired to be tested with an oscilloscope or synchroscope or connected to a terminal B when the attachment is also used in addition to the oscilloscope or synchroscope. This arrangement is very advantageous in practice.

As shown in FIG. 3A when the steady state of a circuit under test is at low level and when a high-level single pulse is to be detected, the operator must continue to hear the sound signal with the low frequency $f_2$ as described above. Therefore the switch $S_L$ is actuated to close the contact B so that the NAND gate 22 is closed to interrupt the output of the oscillator 4.

Figure 3D:
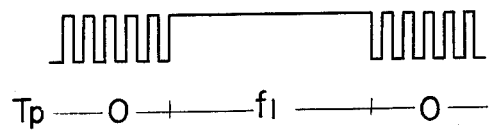

When a high-level or positive pulse appears at a time $t_1$ and disappears at a time $t_2$, the monostable multivibrators 5 and 6 are triggered in the manner described above, so that the sound with the frequency $f_1$ representing the high-level pulse is heard when the monostable multivibrator 5 is turned on and the sound with the frequency $f_2$ is heard when the monostable multivibrator 6 is turned on. After the multivibrator 6 is turned off no sound is heard. Thus the noise pulse may be clearly detected in the soundless background. Furthermore when the attachment is maintained in the soundless state, the operator may actuate the switch $S_L$ to close the terminal A so as to check that the steady state of the circuit under test is at low level. The pattern of change in frequency of the sound signals produced by the attachment is shown in FIG. 3A at $T_L$. When the switch $S_H$ is operated to close the contact B, the pattern of change in frequency as shown in FIG. 3B at $T_H$ is obtained so that the negative pulse may be detected. When the switch $S_p$ is actuated to close the contact B the sound with either of the frequency $f_1$ or $f_2$ may be heard when the burst-like signal appears as shown in FIG. 3D while no sound is heard as long as the pulse train continues.

Figure 5:
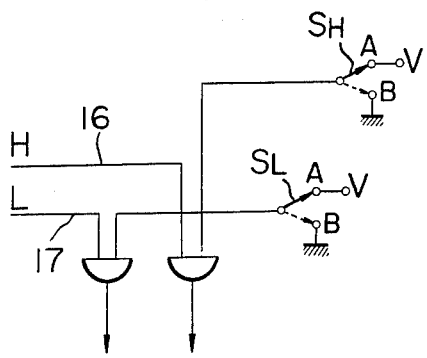
FIGS. 5 and 6 show examples of audio or sound signal level selecting means comprising logic circuits.
Figure 6:
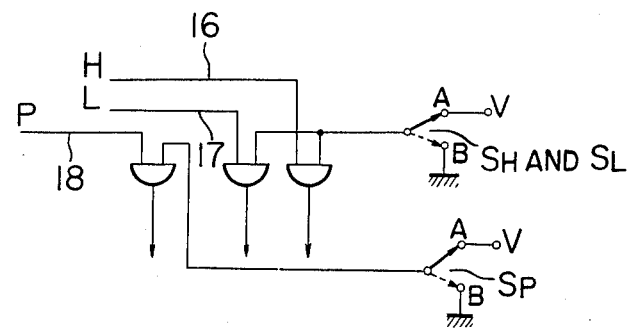

The switches have been described so far as being inserted into the signal lines 16, 17 and 18, but they may comprise logic circuits as shown in FIG. 5 or only one switch may be provided in order to eliminate neither of the sounds representing the levels of the detected signals as shown in FIG. 6.

Figure 7:
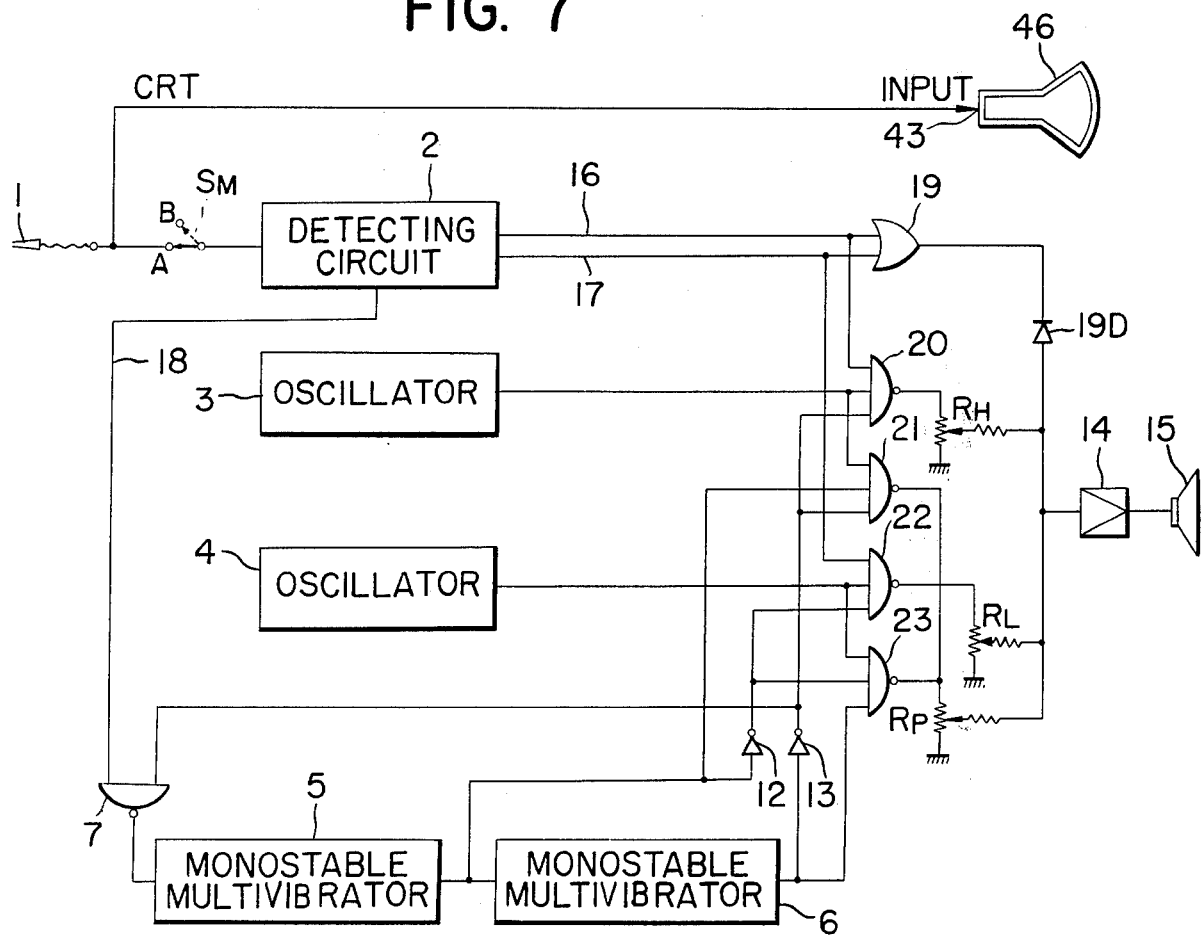
FIG. 7 is a block diagram of the attachment shown in FIG. 3 in which variable resistors are used instead of switches for controlling the level of the sound signals.

Instead of the manual switches, variable resistors $R_H, R_L$ and $R_p$ may be used as shown in FIG. 7 so that the volume of the sound may be automatically controlled to a desired level. The variable resistors $R_H, R_L$ and $R_p$ are used to control the levels of the sounds representing the high and low level signals and the pulse signal according to the demand of the operator. This arrangement is more advantageous in practice than the manual switches described above. When the variable resistors are used, the dials 27 or the like may be provided instead of the switches $S_H, S_L$ and $S_p$ shown in an embodiment shown in FIG. 12.

Attachment, FIGS. 8–11

Figure 4:
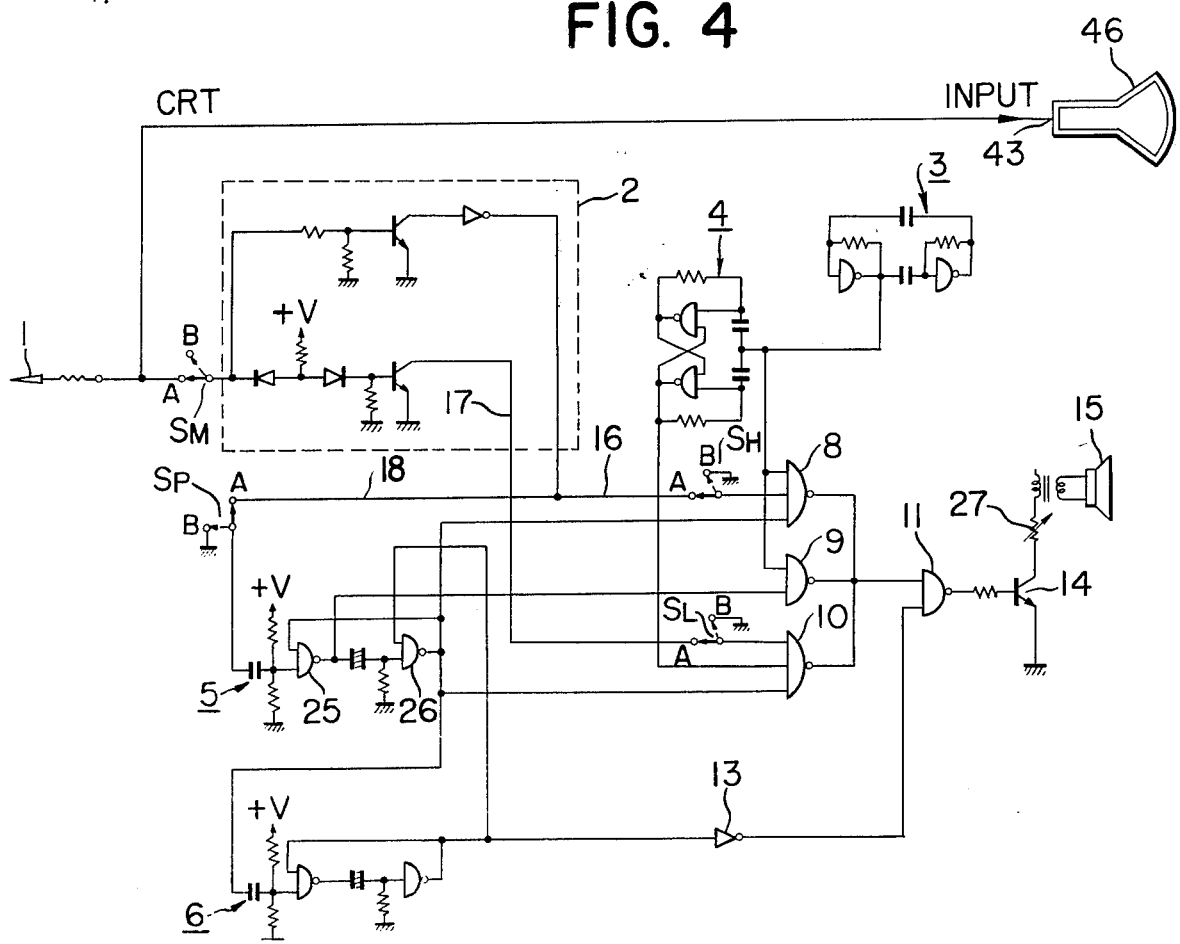
FIG. 4 is a detailed circuit diagram of the attachment shown in FIG. 1.
Figure 8:
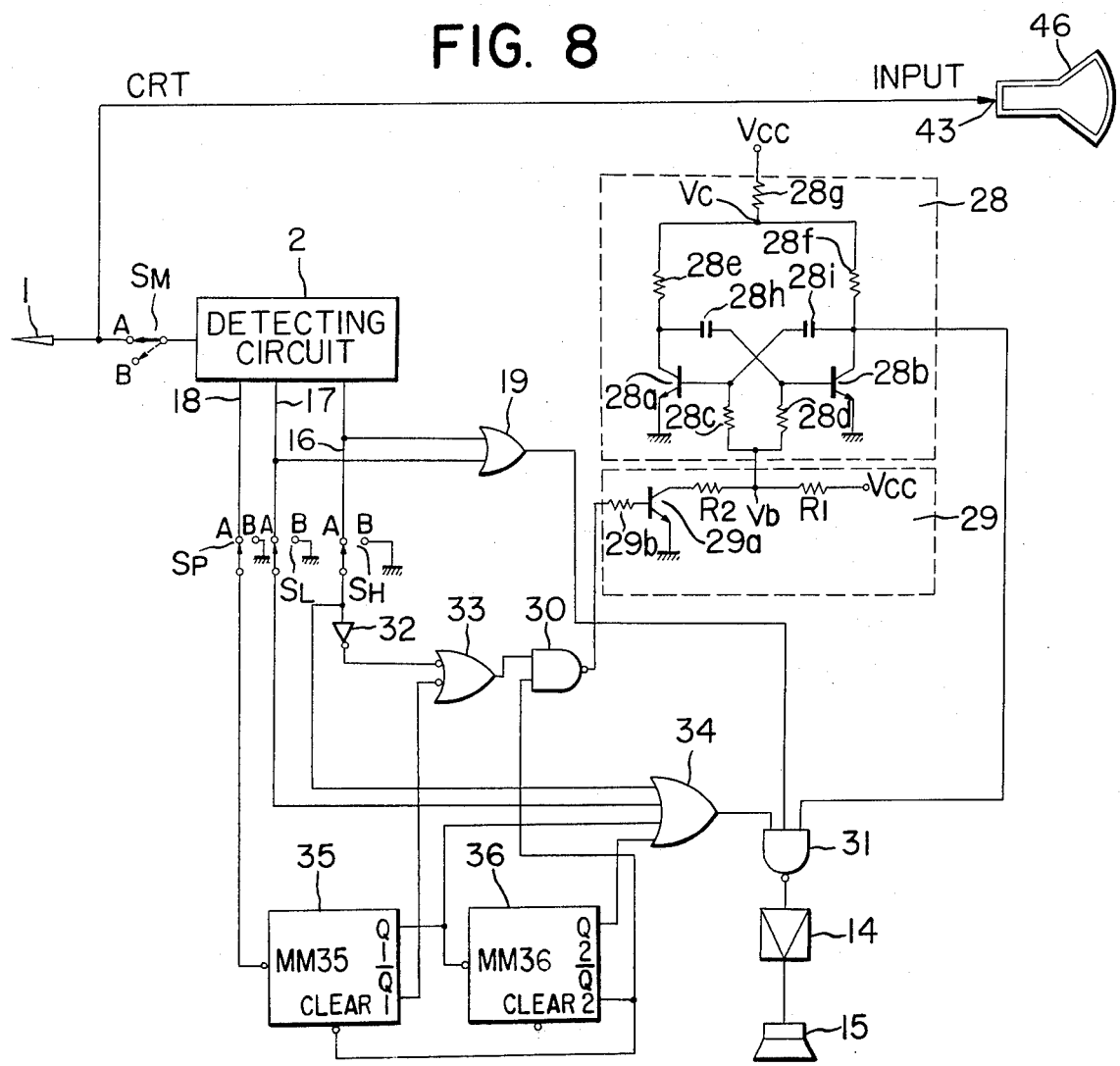
FIG. 8 is a circuit diagram of an attachment of the type incorporating therein only one oscillator capable of varying its oscillation frequency.
Figure 9:
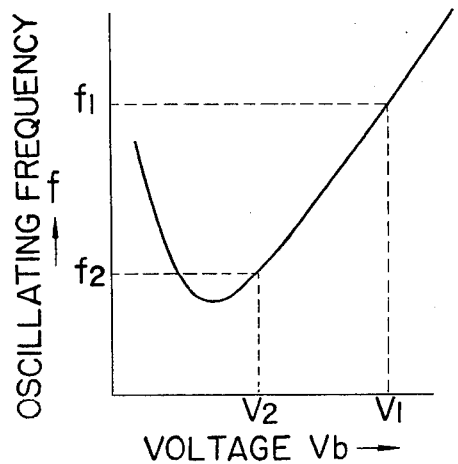
FIG. 9 is a graph used for the explanation thereof.
Figure 10:
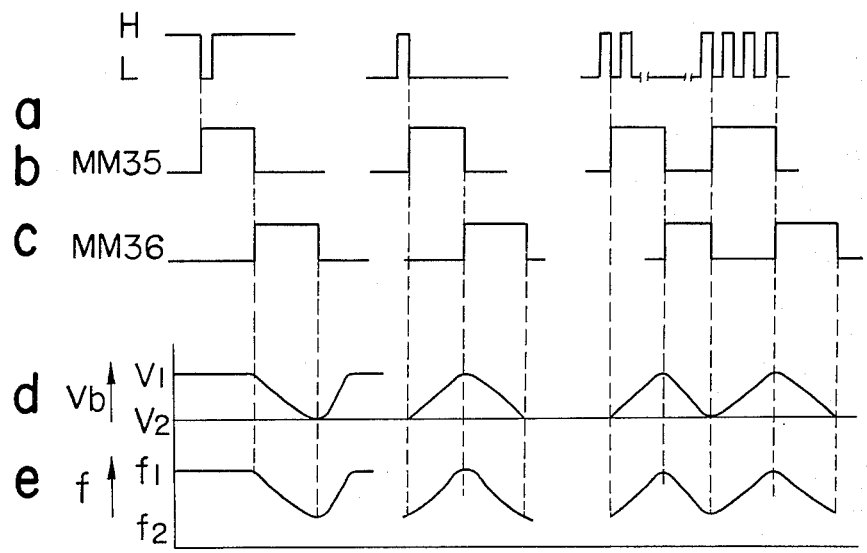
FIG. 10 shows the waveforms also used for the explanation thereof.
Figure 11:
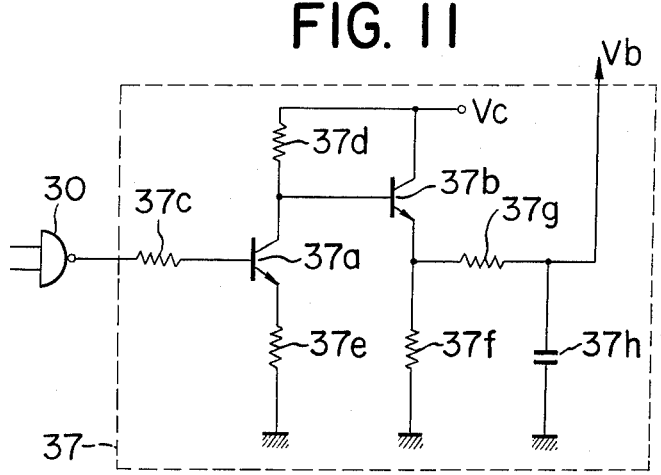
FIG. 11 is a diagram of a switching circuit used with the variable frequency oscillator shown in FIG. 8.

In an attachment or logic circuit test equipment according to the present invention of the type shown in FIG. 8 only one variable-frequency oscillator 28 may be used instead of the two oscillators 3 and 4 shown in FIGS. 1, 2 and 4. Reference numeral 29 denotes a switching circuit for varying the oscillation frequency of the oscillator 28, 30 and 31, NAND circuits; 32, an inverter; 33, NOR circuit; 19 and 34, OR circuits; 35 and 36, monostable multivibrators provided with a clear input terminal and so connected as to be triggered sequentially. It is assumed that all of the switches close the contacts A. In response to the detection of a high-level voltage by the test probe 1, the output of the NAND circuit 30 falls to a low level and a transistor 29a in the switching ciucuit 29 is turned off so that the voltage $Vb$ obtained by a voltage divider consisting of resistors $R_1$ and $R_2$ becomes substantially equal to $Vcc$. Then the oscillator 28 starts the oscillation at a predetermined frequency $f_1$. The high-level signal on the line 16 is applied through the OR circuit 34 to the NAND circuit 31 so that the latter is opened. Therefore the sound with the frequency $f_1$ is heard. When the low-level signal is detected, it appears only on the low-level detecting line so that the output of the inverter 32 rises to a high level. As a result the output of the OR circuit 33 falls to a low level but the output of the NAND circuit 30 rises to a high level so that the transistor 29a is turned on. As a result the divided voltage $Vb$ given by $$Vb \approx \frac{R_2}{R_1 + R_2} \cdot Vcc$$

which is lower than $Vcc$ is derived. Therefore the oscillator 28 oscillates at a frequency $f_2$ different from the frequency $f_1$. The oscillation frequency of the oscillator 28 varies as shown in FIG. 9 and when the input voltage $Vb$ is changed from $V_1$ to $V_2$, the oscillation frequency is also changed from $f_1$ to $f_2$. However the oscillation frequency is preferably continuously changed from $f_1$ to $f_2$ in order to avoid the adverse effect on the operator and to relieve his fatigue. For this purpose a switching circuit 37 of the type shown in FIG. 11 may be used which comprises transistors 37a and 37b, resistors 37c–37g and capacitor 37h. The resistor 37g and the capacitor 37h are connected so as to form a first delay filter with a time constant RC substantially equal to that of the monostable multivibrators 35 and 36 so that the waveform $Vd$ as shown in FIG. 10d may be obtained. Therefore the oscillation frequency of the oscillator 28 may vary continuously as shown in FIG. 10 at $e$ so that the soft sound may be heard. It is to be understood that instead of the astable multivibrator 28 any other suitable oscillator may be used.

Figure 13:
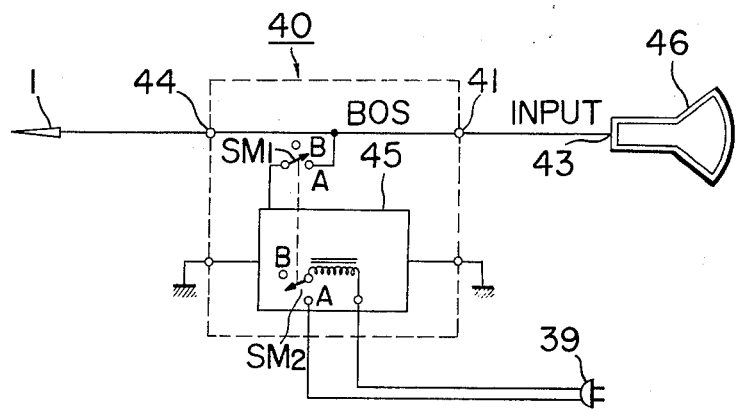
FIG. 13 is a block diagram thereof.
Figure 12:
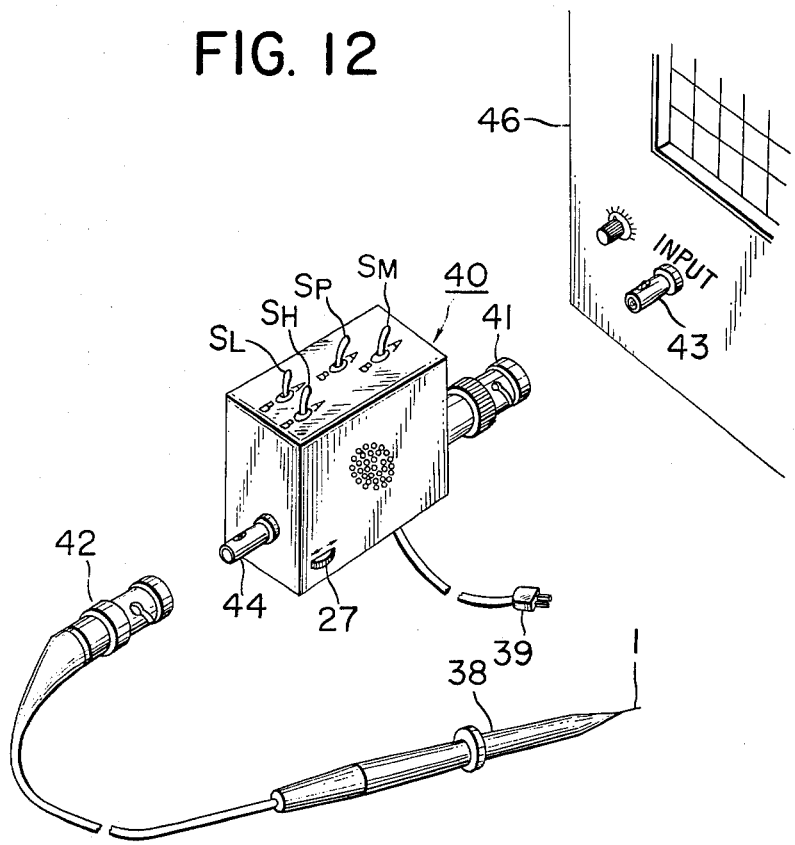
FIG. 12 is a perspective view of a logic circuit test equipment according to the present invention.

Logic circuit test equipment, FIG. 12 and 13

One of the embodiments of a logic circuit test equipment of the present invention is shown in perspective view in FIG. 12 and in block diagram in FIG. 13. A housing 40 is provided with a box in which are disposed the switches, a plug 41 for connection with a receptable 43 of an oscilloscope 46 and a receptacle 44 similar to the receptacle 43. In operation the equipment 40 is electrically connected with the oscilloscope 46 with the plug 41 and receptacle 43 and a plug 39 is connected to a power source. A probe 38 is connected through the receptacle 44 and the plug 42. When the test equipment is used in conjunction with the oscilloscope 46, the switch $S_M$ closes the contact A but when the test equipment is not used the switch $S_1$ closes the contact B. When only the test equipment is used it is not necessary to couple it with the oscilloscope, but it may be used even when it is connected to the oscilloscope. As shown in FIG. 13 the switch $S_M$ comprises ganged switches $SM_1$ and $SM_2$ which may be used as an on-off switch for the power source. Since the plugs 41 and 42 and the receptacles 43 and 44 are those used with the conventional oscilloscopes, the versatality of the test equipment may be much increased. The logic circuits may be tested in a simple manner by the sound signals without the operator turning his eyes away from the oscilloscope and without the oscilloscope being modified. This is the most important feature of the present invention.

Figure 14:
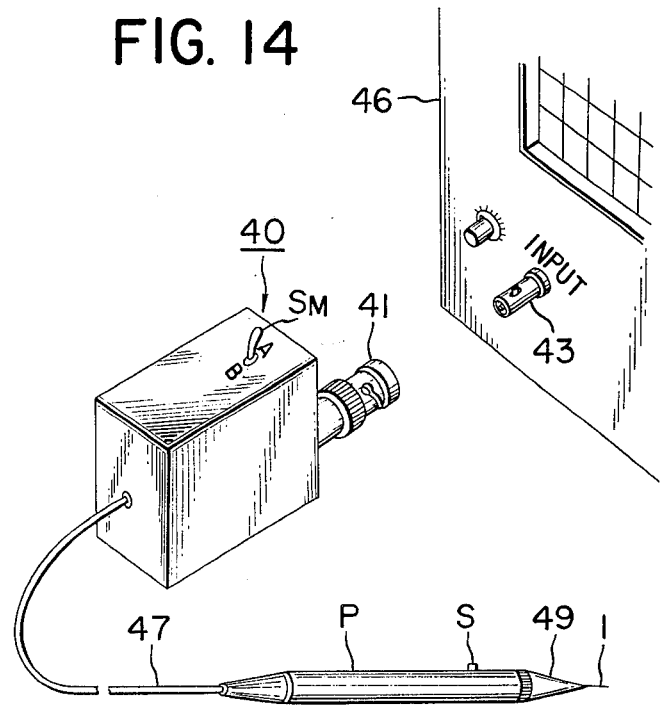
FIG. 14 is a perspective view of another embodiment of a logic circuit test equipment according to the present invention.

So far the logic circuit test equipment of the type for testing the logic circuits by the audio signals not by the visual signals has been described, but according to the present invention the logic circuit may be generally tested visually and then precisely tested by the oscilloscope without turning away the eyes by another embodiment of the present invention in which display means is provided on the head of the probe and which may be connected to the oscilloscope. This embodiment shown in FIG. 14 is similar to that shown in FIG. 12 except that a circuit within installed in the housing 40 and a probe P are different from those shown in FIG. 12.

Figure 15:
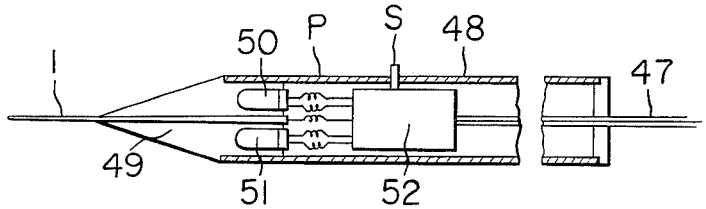
FIG. 15 is a sectional view of a probe thereof.

Probe, FIG. 15

As shown in FIG. 15 the probe P is provided with display means 50 and 51 which are disposed within a transparent head 49 and flash to indicate the voltage level of a circuit under test as in the sound type test equipments described hereinbefore generates the sound signal so that the operator may generally inspect the circuit without turning his eyes away from the oscilloscope. The head 49 of the probe P is made of a transparent material and its surface is matted so that the operator may see the flashing light very easily. The probe P further comprises a casing 48 incorporating therein the head 49, display means 50 and 51, and a switch S. Any suitable display means 50 and 51 such as electroluminescent diodes, lamps, liquid crystal or the like may be used, but it is preferable that they may emit light of different colors. In the instant embodiment when a circuit under test is at a high level display means 50 emits red light whereas when a circuit under test is at a low level, display means 51 emits green light. The switch S and the like are housed within an inner casing 52, and a logic level detecting circuit is incorporated within the casing of the attachment.

Figure 16:
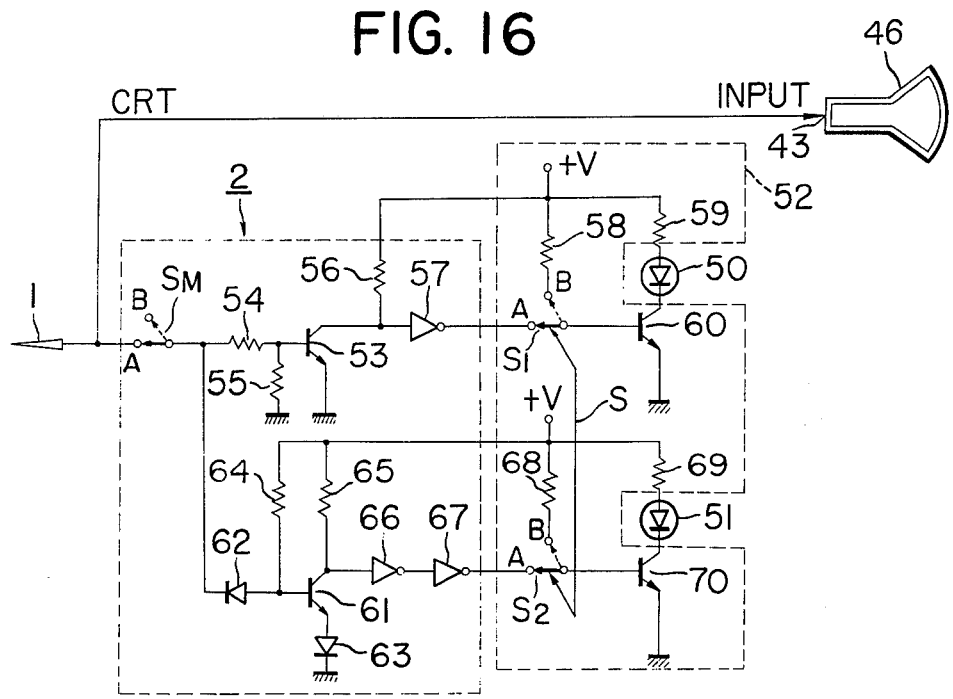
FIG. 16 is a diagram of an electric circuit thereof.

Circuit, FIG.16

Referring to FIG.16 a high-level detecting circuit comprises a transistor 53, resistors 54, 55 and 56, inverters 57, a switch $S_1$, a transistor 60, resistors 58 and 59 and an electroluminescent diode 50. A low-level detecting circuit comprises a transistor 61, diodes 62 and 63, resistors 64 and 65, inverters 66 and 67, a switch $S_2$, resistors 68 and 69, a transistor 70, and an electroluminescent diode 51. The gang switch S comprising the switches $S_1$ and $S_2$ closes the contacts A, and the oscilloscope 46 is connected to the test probe P.

When the logic level of a circuit under test is at a high level the electroluminescent diode 50 emits red ligth but when the logic level is at a low level the electroluminescent diode 51 emits green light so that the operator may test the logic circuit without turning his eyes away from the oscilloscope or the test probe P. Furthermore he may more precisely test a logic circuit by observing the waveform displayed on the oscilloscope. When a circuit under test is generating a pulse train, the electroluminescent diodes 50 and 51 alternately flash so that the light of mixed color is emitted from the head 49 of the test probe P. Therefore the operator or inspector may check the approximate value of the duty which is the ratio of the time of the high level of the pulse to that of the low level. The light of mixed color emitted from the head 49 of the test probe P changes from red, orange, yellow orange, yellow, yellow green to green depending upon the change in duty. Thus the test of the logic circuits may be much facilitated.

Figure 18:
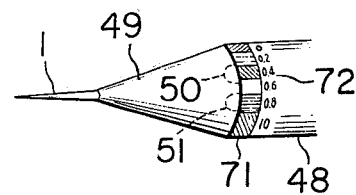
FIG. 18 is a fragmentary view, on enlarged scale, of the probe shownn in FIG. 15.
Figure 17:
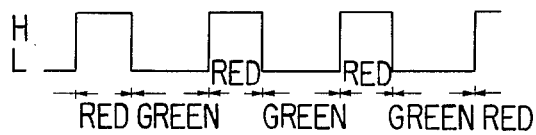
FIG. 17 is a view used for the explanation of the mode of operation thereof.

FIG.17 shows the waveform of a pulse train whose duty is 0.67, that is the time or duration of the high level to that of the low level is 2 : 3. In this case the light emitted from the head 49 of the probe P is almost yellow green and is compared with a color code 71 shown in FIG.18. The color code 71 is provided with various colors so that the color of light emitted from the head 49 may be compared with them so as to detect an approximate value of duty. For this purpose the color code 71 is marked with the numbers 72 indicating the duties. Any suitable color code may be used and the color code may be located at any position, but it is preferable that it is located adjacent to the display means, that is the head of the probe. The testing procedure may be much facilitated when the display means is also used to illuminate a point to be checked in a logic circuit under test.

As described hereinbefore the electronic circuits are generally miniaturized and the microelectronic equipment and devices assembled from these miniaturized electronic circuits become very complex in construction so that it has been difficult for an inspector to find out a point to be checked because it is generally shadowed by the wires or component parts. Furthermore the electronic circuits are generally in the form of printed circuit boards so that the color of the printed circuit patterns which are generally copper foils or films is similar to that of the boards and that the small symbols or the like marked upon the printed circuit boards are shadowed by the wirings or the like.

In order to overcome this problem, a switch is provided to turn on the display means 50 and 51 so that they may be used to illuminate a point to be checked in a logic circuit under test even when the probe is not in contact with the point to be checked.

In FIG.16 the gang switch S is provided for this purpose. When the gang switch S is manually actuated to close the contacts B, both the electroluminescent diodes 50 and 51 are turned on to illuminate a point to be checked in a circuit under test. After the probe has been made into contact with a desired point, the switch S is operated to close the contacts A so that the level of the circuit under test may be detected in the manner described above. In the instant embodiment, both the electroluminescent diodes 50 and 51 are turned on for illumination, but it will be understood that only one electroluminescent diode may be turned on if it emits sufficient illumination light.

Figure 19:
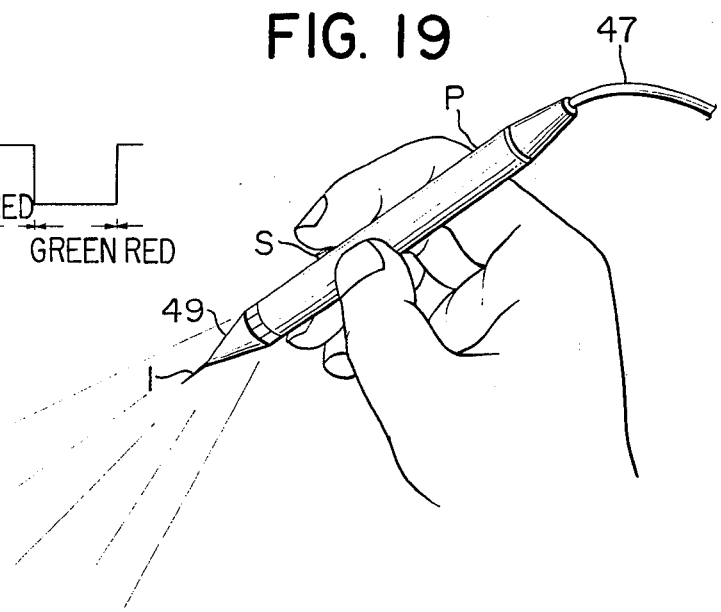
FIG. 19 is a perspective view illustrating the use of the probe shown in FIG. 15.

The mode of use of the probe P of the type described is illustrated in FIG.19. As described above when the display means are used as an illumination light source, the logic circuits may be tested at a high speed.

Figure 20:
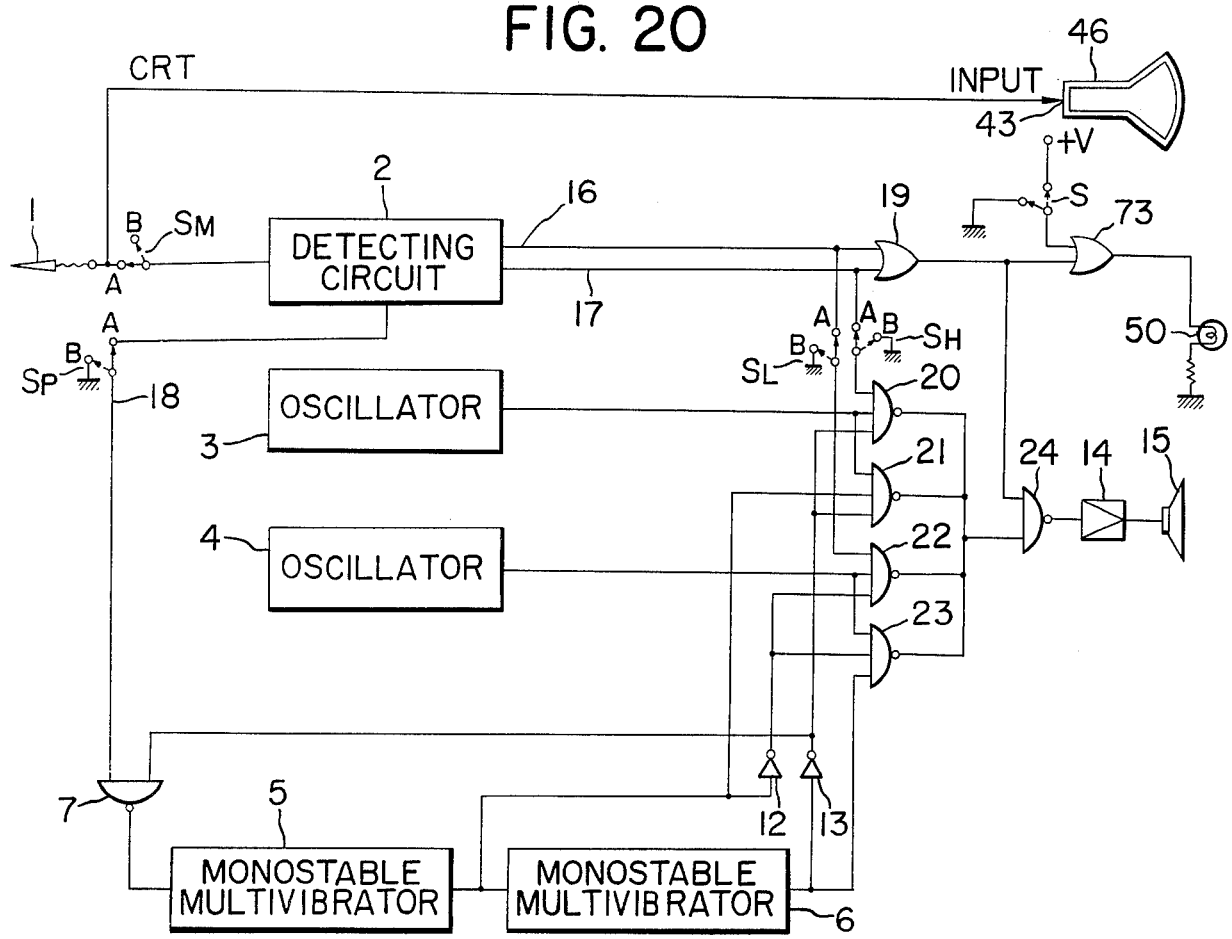
FIG. 20 is a block diagram of another embodiment of the attachment of a logic circuit test equipment of the present invention.

The illumination light source of the type described above may be also applied to the audio type circuit test equipment of the type described. One embodiment is shown in FIG.20 in which the illumination light source is incorporated in the logic circuit test equipment shown in FIG.2. Since the probe used in the circuit shown in FIG.2 is used in conjunction with the ordinary type oscilloscope, the probe of the type shown in FIG.15 may be used or an illumination lamp may be attached to the head of the conventional probe.

Figure 21:
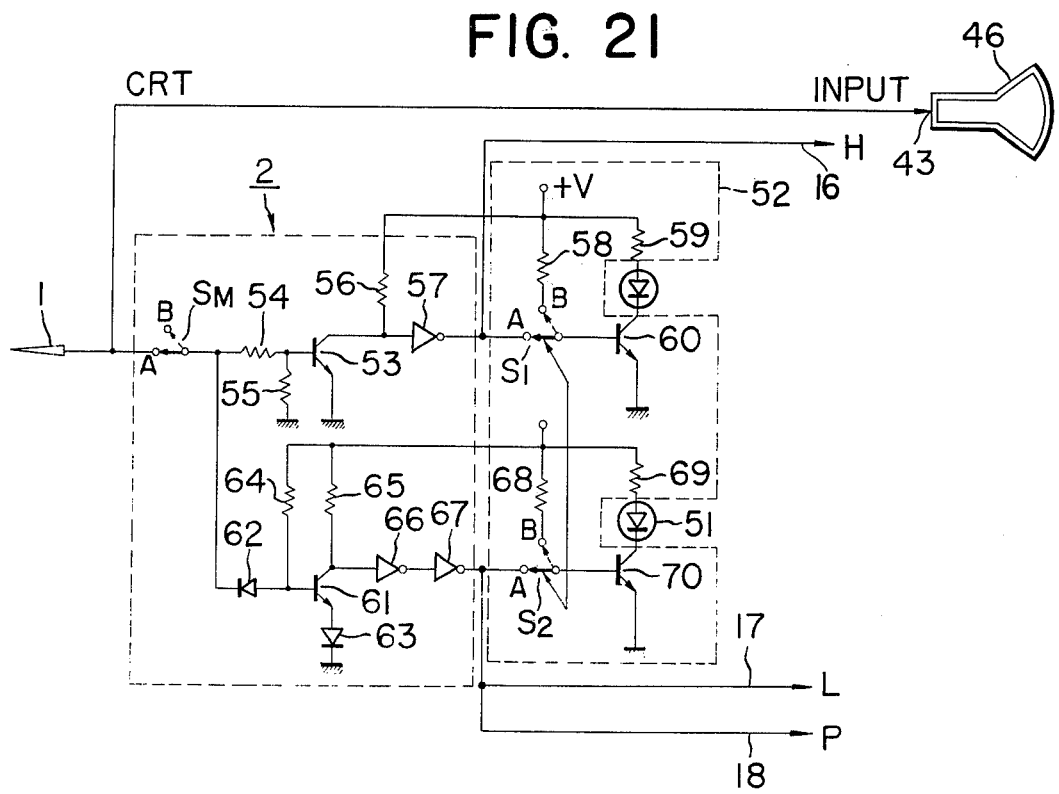
FIG. 21 is a circuit diagram of a still another embodiment of the attachment in accordance with the present invention.

Audio-Visual Type Test Equipment, FIG.21

According to the present invention a combined audio-visual type logic circuit test equipment may be provided in order to facilitate the testing. As shown in FIG.21, the output signals of the detector 2 are transmitted through the high-level line 16, the low-level line 17 and the pulse line 18 to the logic gates of the audio type logic circuit test equipments shown in FIGS.1, 2,4,7 and 8. Thus when a circuit under test is at a high level, the operator not only hears the sound of the high frequency $f_1$ through the electroacoustic transducer but also see the red light emitted from the head of the probe so that he may more positively detect the high level of the circuit under test. Furthermore the operator may detect the duty of a pulse train from the light of mixed color emitted from the head of the probe without observing the oscilloscope while he hears the sound of alternating frequencies $f_1$ and $f_2$ so that the circuit may be tested with a higher degree of accuracy. Moreover the display means may be used as an illumination source as described above.

Figure 22:
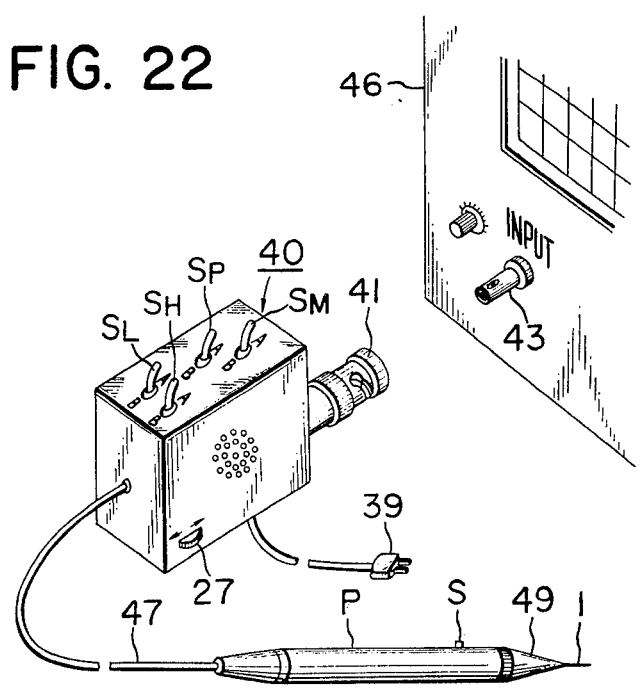
FIG. 22 is a perspective view of the logic circuit test equipment incorporating the circuit shown in FIG. 21.

FIG.22 shows a logic circuit test equipment in which the circuit shown in FIG.21 is incorporated within the attachment 40. The conventional oscilloscope may be used without any modification, and the test only by the oscilloscope may become possible without disconnecting the attachment. Furthermore the test only by the attachment may be possible without disconnecting the oscilloscope. The logic circuit test equipment of the present invention are therefore very versatile in use.

The power required for energizing the attachment may be supplied not from the commercial power source but from the battery incorporated in the attachment or from the circuit under test, so that the plug 39 shown in FIG.14 may be eliminated.

Figure 23:
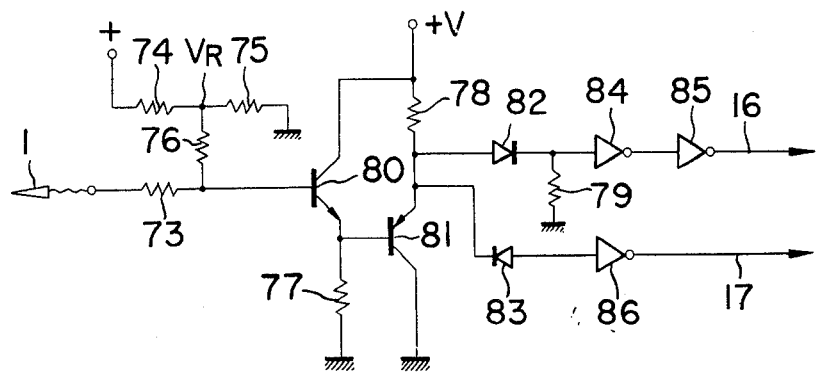
FIGS. 23, 24 and 25 are diagrams of detecting circuits used in a logic circuit test equipment of the present invention.
Figure 24:
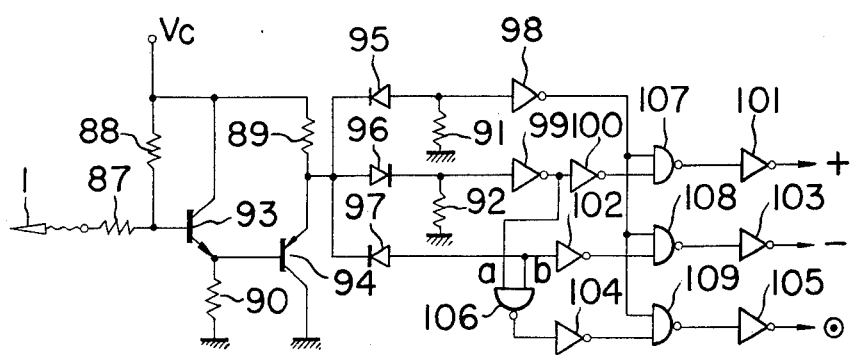

Detecting circuits, FIGS.23 and 24

Two other embodiments of the detecting circuit of the logic circuit test equipment in accordance with the present invention will be described with reference to FIGS.23 and 24. The detecting circuit comprises TTLs or transistor-transistor logics and DTLs or diode-transistor logics. The threshold voltage level of a TTL or DTL is 1.4 V and the output level is of the order of 5 V. Therefore only the circuit constant is changed as the voltage level is changed in the logic circuit comprising other transistor circuits such as ICs or LSIs, but the objects of the present invention may be accomplished.

The detecting circuit 2 shown in FIG.23 comprises resistors 73–79, transistors 80 and 81, diodes 82 and 83, and inverters 84, 85 and 86. Instead of the inverters, NAND circuits comprising IC may be employed because an inverter may be formed by utilizing one input line of a NAND circuit. The resistors 74 and 75 are so selected that the voltage at their joint $V_R$ equals to 1.4 V which is the threshold voltage of the inverters 84–86. The value of the resistor 76 is selected to be extremely higher than that of the resistor 73 so that the latter may be negligible as compared with the former. Both the transistors 80 and 81 are emitter-followers and the base voltage of the transistor 80 equals the emitter voltage of the transistor 81. When the probe 1 is floating, that is when it is out of contact with a circuit under test the base voltage of the transistor 80 equals $V_R$ so that the emitter voltage of the transistor 81 is also equal to $V_R$. Therefore the input to the inverter 84 is lower than $V_R$ by the forward voltage drop (about 0.6 V in case of a silicon diode) of the diode 82 so that the output of the inverter 84 is 1 whereas the output of the inverter 85 is 0. The input of the inverter 86 is higher than $V_R$ by the reverse voltage drop $V_D$ of the diode so that the output of the inverter is 0. As a result neither the sound and light are produced by the test equipment or attachment. When the high level voltage $V_1$ is impressed to the probe 1, the base voltage of the transistor 80 almost equals the high-level voltage $V_1$ because the resistor 76 >> the resistor 73. Therefore when $V_1 - V_R > V_D$, the input to the inverter 84 becomes 1 so that the output of the inverter 84 becomes 1, but the output of the inverter 86 remains 0. When the low-level voltage $V_o$ is impressed to the probe 1, $V_R - V_o < V_D$ so that the input to the inverter 86 becomes 0 and the output thereof becomes 1. The output of the inverter 85 is 0.

The detecting circuit 2 shown in FIG.24 is adapted to test three-level logic circuits which recently find wide applications in the digital logic circuits. In the three-level logic, three levels +,– and ◎ are combined in order to carry out various arithematic operations, controls, decisions, and the like opposed to the two-level logic wherein only two levels, 1 or 0 are used.

The three-level circuit shown in FIG.24 comprises resistors 87–92, transistors 93 and 94, a Zener diode 95, diodes 96 and 97, inverters 98–105 and NAND circuits 106–109. The voltage Vcc applied to the collector of the transistor 93, the emitter of the transistor 94 and the resistor 80 is so selected as to be different from the three logic levels. (In the instant embodiment Vcc is a high voltage). The value of the resistor is extremely higher than that of the resistor 87. When the probe 1 is floating the base voltage of the transistor 93 is almost equal to Vcc so that the emitter voltage of the transistor 94 also equals Vcc. When $Vcc - V_z > V_T$ (where $V_z$ = zener voltage of the zener diode 95, and $V_T$ = threshold voltage almost equal to 1.4 V), the output of the inverter 98 becomes 0, so that the outputs of the inverters 101, 103 and 105 are all 0s as the NAND circuits 107, 108 and 109 are inserted.

When the + level voltage $V_1$ is impressed to the probe 1, the base voltage of the transistor 93 becomes almost equal to $V_1$ because the resistor 88 >> the resistor 87. Since $V_1 - V_z < V_T$ the output of the inverter 98 is 1 and the NAND circuits 107, 108 and 109 are opened. When $V_1 - V_D > V_T$, the signal passes through the inverters 99 and 100 and the NAND circuit 107 so that the output of the inverter 101 becomes 1. Since the input to the inverter 102 is 1, the output of the inverter 103 is 0. The output of the inverter 105 is 0 because the input applied to one of the input terminals $a$ of the NAND circuit 106 is 0.

When − level voltage $V_o$ is impressed to the probe 1, the output of the inverter 98 becomes 1. Since the input to the inverter 99 is 0 the output of the inverter 101 is 0. The input to the inverter 102 is 0 so that the output of the inverter 103 is 1. The output of the inverter 105 is 0 because the input to the other input terminal $b$ of the NAND circuit 106 is 0.

When ◎ level voltage $V_◎$ is impressed to the probe 1, $V_◎ - V_D < V_T$ so that the input to the inverter 96 becomes 0 and the output of the inverter 99 becomes 1. Since $V_◎ + V_D > V_T$ the input to the inverter 102 is 1 so that the inputs to the input terminals $a$ and $b$ of the NAND circuit 106 are 1s. As a result the output of the inverter 105 becomes 1 but the outputs of the inverters 101 and 103 become 0s.

Thus the logic circuit test equipment of the present invention may test logic circuits with three levels.

The detecting circuits 2 of the present invention are designed to be applied a specific ICs. For example in TTLs in digital ICs the low level voltage is 0.4 V whereas the high level voltage is 2.4 V, and in other circuits sold under the trademark of Hi Noise Immunity Transistor Logic (HNINTL) by Texas Instruments Corp. the low level voltage is 1.8 V whereas the high-level voltage is 8 V because the voltage of the power source used is different. Therefore the logic circuit test equipment of the type incorporating one of the detecting circuits described above cannot test all of the various logic circuits. Therefore the level of the voltage of a circuit under test must be adjusted by means of a potentiometer or the like or various detecting circuits each designed for testing a specified logic circuit must be provided. The above problem may be also overcomed by the present invention.

Figure 25:
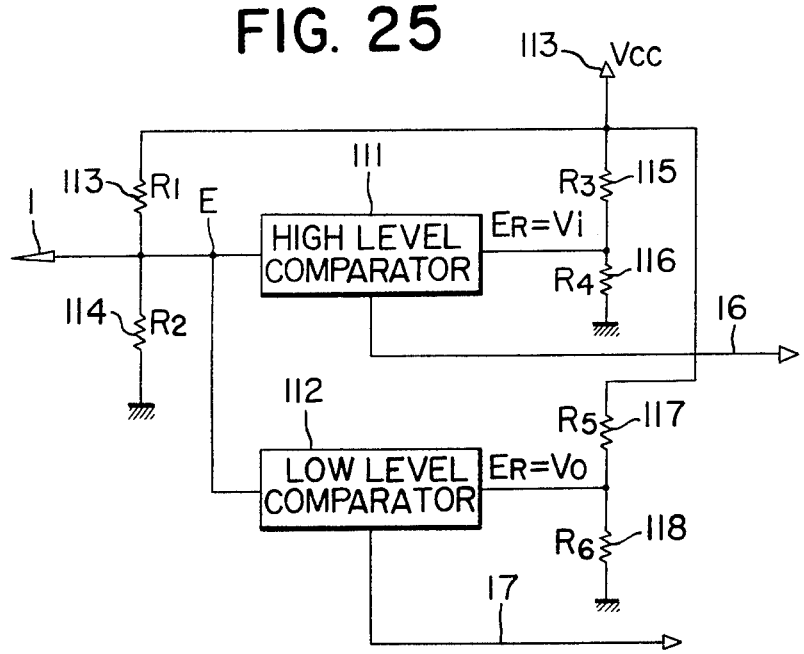
Figure 26:
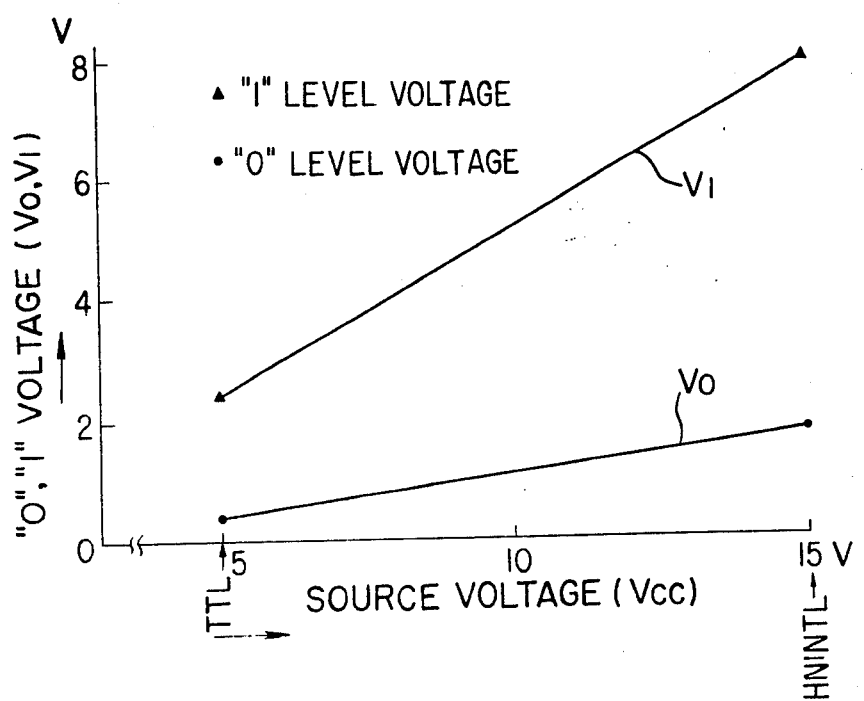
FIG. 26 is a graph used for the explanation of the circuit shown in FIG. 25.

Universal type detecting circuit, FIG. 25

A detecting circuit shown in FIG. 25 is a variation of the circuit shown in FIG. 1 and is adapted to test all of logic levels of various digital ICs. The voltages of the power source, the high and low levels, and the ratios thereof to the power source voltage of the conventional digital ICs are shown in the table below:

| IC | Power source voltage Vcc (v) | Low-level voltage (Vo) | Vo/Vcc | High-level voltage (V₁) | V₁/Vcc |
|---|---|---|---|---|---|
| TTL (DTL) | 5 | 0.4 (0.08) | 0.08 | 2.4 (0.48) | 0.48 |
| HNINTL | 15 | 1.8 (0.12) | 0.13 | 8 (0.53) | 0.53 |
| CMOS | 3 to 15 | less than 1 to 5 less than 0.33 | | higher than 1 to 5 higher than 0.33 | |

Remarks: Values in the parentheses indicate the ratios of threshold voltages.

From the above table it is seen that the average ratio of the high-level voltage to the power source voltage is of the order of 0.5 and the average ratio of the low-level voltage to the power source voltage is of the order of 0.1 in the conventional digital ICs. Therefore the digital ICs with different power source voltages may be tested by a single test equipment if the voltages 0.1 and 0.5 times of the power source voltage are used as reference low-level and high-level voltages in a low-and high-level voltage comparators.

In the embodiment shown in FIG. 25, a low- and high-level comparators 111 and 112 adapted to be used with all of the conventional ICs are provided together with resistors 113–118 whose values are indicated by $R_1$–$R_6$, respectively.

The high-level reference voltage $E_R$ is applied to the high-level comparator 11, and a reference voltage $E_R$ is derived by dividing the power source voltage Vcc of a circuit (a digital IC) under test by the resistors 115 and 116 and 117 and 118 so that the following relations may be satisfied.

$$E_R = V_1 \text{ (high-level voltage)} = \frac{R_1}{R_3 + R_4} \cdot Vcc = 0.5 \; Vcc$$

Similarly the reference voltage $V_R$ given by $$E_R = V_o \text{ (low-level voltage)} = \frac{R_6}{R_5 + R_6} \cdot Vcc = 0.1 \; Vcc$$

is applied to the low-level comparator 112. Therefore the high-level and low-level voltages $V_1$ and Vo which are in proportion to the Vcc may be obtained as shown in FIG. 16.

In operation a terminal 113 is connected a power source terminal of a digital IC under test and a terminal 114 to a ground terminal. When the voltage level impressed to the probe 1 is higher than $V_1$, the high-level comparator 111 is actuated so that the output signal appears on the output line 16 and is transmitted to for example the AND gate 8 in the circuit shown in FIG. 1 so that the high level voltage may be detected by the sound, light or by both in the manner described hereinbefore. When the voltage less than Vo is impressed the low-level comparator 112 is actuated so that its output signal is transmitted through the output line 17 to for example the AND gate 10 in the circuit shown in FIG. 1 so that the low level voltage may be detected in the manner described above.

The values $R_1$ and $R_2$ of the resistors 113 and 114 are so selected as to satisfy the following relation $$V_1 = \frac{R_4}{R_3+R_4} \cdot Vcc > \frac{R_2}{R_1+R_2} \cdot Vcc > \frac{R_6}{R_5+R_6} \cdot Vcc = V_o$$

so that when the probe 1 is floating that is when it is not made into contact with any point no signal appears on the output lines 16 and 17.

Figure 27:
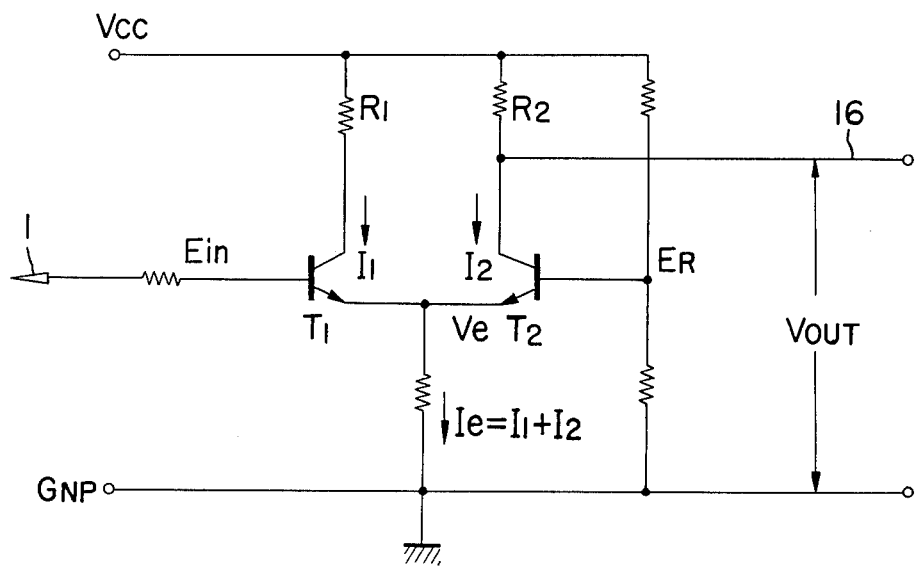
FIG. 27 is a diagram of a comparator used in the circuit shown in FIG. 25.
Figure 28:
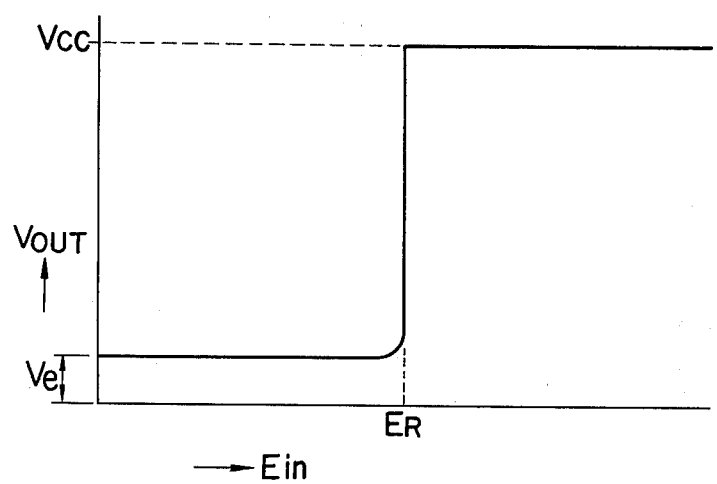
FIG. 28 is a graph used for the explanation of the comparator shown in FIG. 27.

FIG. 27 shows one example of a circuit diagram of a conventional comparator.

I claim:

1. Electronic circuit test equipment including a cathode ray tube detachably connected thereto using a plurality of information signals comprising a probe for sensing logic electrical signals from a logic circuit under test, detecting means comprising a first stage for detecting said logic electrical signals of a predetermined first level sensed by said probe, and a second stage for detecting said logic electrical signals of a predetermined second level sensed by said probe, detected signal converting means connected to said detecting means triggered in response to a variation of said logic electrical signal levels detected by said detecting means, oscillator means for providing an audio frequency signal, a plurality of gate means having inputs coupled selectively to an output of said oscillator means, outputs of said first and second stages of said detecting means, and an output of said detected signal converting means, electroacoustic transducer means coupled for being driven by said gate means, whereby a plurality of predetermined electrical conditions of the logic circuit under test can be converted into a plurality of tones of different frequencies audible to an inspector, said cathode ray tube indicating logic electrical signal waveforms from said logic circuit under test, connecting means provided between an input of said cathode ray tube and an output of said probe, a switching means interposed between the probe and an input terminal of the detecting means in such a manner that the flowing of the sensed logic electrical signals into the detecting means is controlled by manually operating said switching means, whereby the oscillation sounds developed from the electroacoustic transducer means can be interrupted when not desired.

2. Electronic circuit test equipment including a cathode ray tube detachably connected thereto using a plurality of information signals as set forth in claim 1 wherein said electroacoustic transducer means comprises a loudspeaker.

3. Electronic circuit test equipment including a cathode ray tube detachably connected thereto using a plurality of information signals as set forth in claim 1 wherein said oscillator means selectively provides a plurality of different oscillation frequencies at said electroacoustic transducer means.

4. Electronic circuit test equipment including a cathode ray tube detachably connected thereto using a plurality of information signals as set forth in claim 1 wherein said detected signal converting means comprises a monostable multivibrator.

5. Electronic circuit test equipment including a cathode ray tube detachably connected thereto using a plurality of information signals as set forth in claim 1 wherein said oscillator means comprises an astable multivibrator.

6. Electronic circuit test equipment including a cathode ray tube detachably connected thereto using a plurality of information signals as set forth in claim 1 wherein said connecting means comprises a plug and a receptacle.

7. Electronic circuit test equipment including a cathode ray tube detachably connected thereto using a plurality of information signals as set forth in claim 1 wherein said detecting means comprises a comparator circuit for detecting said logic electrical signals from the logic circuit under test.

8. Electronic circuit test equipment including a cathode ray tube detachably connected thereto using a plurality of information signals comprising a probe for sensing logic electrical signals from a logic circuit under test detecting means comprising a first stage for detecting said logic electrical signals of a predetermined first level sensed by said probe, and a second stage for detecting said logic electrical signals of a predetermined second level sensed by said probe, and a third stage for detecting said logic electrical signals of pulse trains, detected signal converting means connected to said detecting means triggered in response to a variation of said signal levels detected by said detecting means, oscillator means for providing an audio frequency signal, a plurality of gate means having inputs coupled selectively to an output of said oscillator means, outputs of said first and second stages of said detecting means, and an output of said detected signal converting means, electroacoustic transducer means coupled for being driven by said gate means, whereby a plurality of predetermined electrical conditions of the logic circuit under test can be converted into a plurality of tones of different frequencies audible to an inspector, said cathode ray tube indicating logic electrical signal waveforms from said logic circuit under test, connecting means provided between an input of said cathode ray tube and an output of said probe, a first switching means interposed between the probe and an input terminal of the detecting means in such a manner that the flowing of the sensed logic electrical signals into the detecting means is controlled by manually operating said first switching means, whereby the oscillation sounds developed from the electroacoustic transducer means can be interrupted when not desired, a plurality of second switching means interposed between a plurality of output lines of the detecting means and an input terminal of said electroacoustic transducer in such a manner that the oscillation sounds developed from the electroacoustic transducer means can be interrupted by controlling the flowing of the detected logic electrical signals into the electroacoustic transducer when not desired.

9. Electronic circuit test equipment including a cathode ray tube detachably connected thereto using a plurality of information signals comprising a probe for sensing logic electrical signals from a logic circuit under test, detecting means coupled to said probe and comprising a first stage for detecting logic electrical signals of a predetermined first level coupled thereto from said probe, a second stage for detecting logic electrical signals of a predetermined second level coupled thereto from said probe, and a third stage for detecting pulses coupled thereto from said probe, a first detected signal converting means coupled to said third pulse detecting stage for providing an output signal in response to the variation in level of the output from said third pulse detecting stage, a second detected signal converting means coupled to said first detected signal converting means for providing an output in response to a variation in level of the output from said first detected signal converting means, a first oscillator means for providing an audio frequency output signal when the output from said detecting means is at said first level, a second oscillator means for providing an audio frequency output signal when the output from said detecting means is at said second level, a plurality of gate means having inputs coupled selectively to the outputs of said first and second oscillator means, said first and second stages of said detecting means, and the outputs of said first and second detected signal converting means, a first gate circuit having a plurality of inputs coupled respectively to said plurality of gate means for providing a drive signal output including said audio frequency signals from said first and second oscillators and different sequences of said audio frequency signals, electroacoustic transducer means coupled for being driven by said gate circuit, whereby a plurality of predetermined electrical conditions of the logic circuit under test can be converted into a plurality of tones of different frequencies audible to an inspector, said cathode ray tube indicating logic electrical signal waveforms from said logic circuit under test, connecting means provided between an input of said cathode ray tube and an output of said probe, whereby a measurement as to whether the detected logic electrical signals are at the first level or at the second level can be effected by hearing the sounds developed from said electroacoustic transducer means without the inspector turning his eyes on the displaying surface of the cathode ray tube.

10. Electronic circuit test equipment including a cathode ray tube detachably connected thereto using a plurality of information signals as set forth in claim 9 wherein said plurality of gate means comprises a first gate means having a plurality of inputs coupled respectively to said first stage of said detecting means, the output of said first oscillator means, and the output of said second detectd signal converting means; a second gate means having a pair of inputs coupled respectively to the output of said first oscillator means, and the output of said first detected signal converting means; and a third gate means having a pair of inputs coupled respectively to said second stage of said detecting means, and to the output of said first detected signal converting means.

11. Electronic circuit test equipment including a cathode ray tube detachably connected thereto using a plurality of information signals comprising a probe for sensing logic electrical signals from a logic circuit under test, detecting means comprising a first stage for detecting said logic electrical signals of a predetermined first level sensed by said probe, and a second stage for detecting logic electrical signals of a predetermined second level sensed by said probe, detected signal converting means connected to said detecting means for producing an output having a stretched pulse width of a pulsed logic electrical signal detected by said detecting means, oscillator means for providing a plurality of audio frequency signals, a plurality of gate means having inputs coupled selectively to the output of said oscillator means, said first and second stages of said detecting means, and the output of said detected signal converting means, an OR gate circuit having a pair of inputs coupled respectively to said first and second stage of said detecting means for receiving the detected logic electrical signal from said detecting means, electroacoustic transducer means coupled for being driven by said gate means and said OR gate circuit, whereby a plurality of predetermined electrical conditions of the logic circuit under test can be converted into a plurality of tones and tone sequences audible to an inspector, said cathode ray tube indicating logic electrical signal waveforms from said logic circuit under test, connecting means provided between an input of said cathode ray tube and an output of said probe, whereby a measurement as to whether the logic electrical signals are at the first level or at the second level can be effected by hearing the sounds developed from the electroacoustic transducer means without the inspector turning his eyes on the displaying surface of the cathode ray tube.

12. Electronic circuit test equipment including a cathode ray tube detachably connected thereto using a plurality of information signals as set forth in claim 11 wherein said oscillator means comprises an astable multivibrator.

13. Electronic circuit test equipment including a cathode ray tube detachably connected thereto using a plurality of information signals as set forth in claim 11 wherein said oscillator means comprises a switching circuit actuatable in response to the electrical signal detected by said detecting means and means for providing an output signal which varies in frequency in response to a variation in output voltage from said switching circuit.

14. Electronic circuit test equipment including a cathode ray tube detachably connected thereto using a plurality of information signals as set forth in claim 11 wherein said detecting means comprises a ternary logic circuit for detecting three discrete levels of the logic electrical signals by said probe.

15. Electronic circuit test equipment including a cathode ray tube detachably connected thereto using a plurality of information signals as set forth in claim 11 further comprising a probe housing for supporting said probe, and illumination means disposed within said probe housing and connected to the output of said OR gate circuit to illuminate a desired check point in the logic circuit under test and to inform the inspector whether the probe is actually in contact with said check point.

16. Electronic circuit test equipment including a cathode ray tube detachably connected thereto using a plurality of information signals as set forth in claim 15 further comprising manual switching means for energizing and de-energizing said illumination means.

17. Electronic circuit test equipment including a cathode ray tube detachably connected thereto using a plurality of information signals comprising a probe for sensing logic electrical signals from a logic circuit under test, detecting means comprising a first stage for detecting said logic electrical signals of a predetermined first level sensed by said probe, a second stage for detecting logic electrical signals of a predetermined second level sensed by said probe, a switching circuit actuatable in response to the electrical signal by said detecting means to provide different output voltages dependent on said actuation, oscillator means coupled to said switching circuit for providing an output signal which varies in frequency in response to a variation in output voltage from said switching circuit, OR gate means having an output terminal, and a pair of inputs coupled to said detecting means, AND gate means having an output, a first input coupled to said oscillator means, and a second input coupled to the output of said OR gate means, so that said oscillator means output is presented at said AND gate means output in response to the presence of logic electrical signals detected by said detecting means, electroacoustic transducer means connected for being driven by said AND gate means, whereby a plurality of electrical conditions in the logic circuit under test can be converted into a plurality of tones of different frequencies audible to an inspector, said cathode ray tube indicating logic electrical signal waveforms from said logic circuit under test, connecting means provided between an input of said cathode ray tube and an output of said probe, whereby a measurement, as to whether the logic electrical signals are at the first level or at the second level, can be effected by hearing the sounds developed from the electroacoustic transducer means without the inspector turning his eyes on the displaying surface of the cathode ray tube.

18. Electronic circuit test equipment including a cathode ray tube detachably connected thereto using a plurality of information signals as set forth in claim 17 further comprising
illumination means connected to be energized by the output of said OR gate means.

19. Electronic circuit test equipment including a cathode ray tube detachably connected thereto using a plurality of information signals as set forth in claim 18 further comprising
a manually operable switch mounted on said probe and connected to said illumination means to permit energization and de-energization of said illumination means.

20. Electronic circuit test equipment, including a cathode ray tube detachably connected thereto, for displaying a plurality of information signals, comprising:
a probe for sensing logic electrical signals from a logic circuit under test;
detecting means comprising a first stage for detecting a predetermined first level of said logic electrical signals sensed by said probe and a second stage for detecting a predetermined second level of said logic electrical signals;
a first detected signal converting means coupled to said detecting means for being triggered in response to a variation in level of the output from said detecting means;
a second detected signal converting means coupled to said first detected signal converting means for being triggered in response to a variation in level of the output from said first detected signal converting means;
a switching circuit actuatable in response to the detection of one of the detected signals from said detecting means to provide different output signals dependent on said actuation, said switching circuit being interconnected to said detecting means;
oscillator means coupled to said switching circuit for providing an output signal which varies in frequency in response to a variation in output voltage from said switching circuit;
electroacoustic transducer means coupled to said oscillator means so that a plurality of electrical conditions in the logic circuit under test can be converted into a plurality of audible signal tones of the different frequencies, whereby a measurement as to whether the logic electrical signals are at the first level or at the second level can be effected by hearing the sounds from said electroacoustic transducer means;
a cathode ray tube for indicating logic electrical signal waveforms from said logic circuit under test; and
means for connecting an output of said probe to an input of said cathode ray tube.

21. Electronic circuit test equipment as defined in claim 20, wherein said oscillator means comprises an astable-multivibrator.

22. Electronic circuit test equipment as defined in claim 20, wherein said switching circuit includes a primary time delay circuit connected to said oscillator means for continuously varying the oscillating frequency of said oscillator means in response to predetermined signals sensed by said probe.

23. Electronic circuit test equipment as defined in claim 20 further comprising a switching means interposed between said probe and an input terminal of said detecting means in such a manner that the flow of the sensed logic electrical signals into said detecting means is controlled by manually operating said switching means, whereby the oscillation sounds developed from said electroacoustic transducer means can be interrupted when not desired.

24. Electronic circuit test equipment as defined in claim 20 further comprising a switching means interposed between said detecting means and said electroacoustic transducer means in such a manner that the flow of the sensed logic electrical signals into said detecting means is controlled by manually operating said switching means, whereby the oscillation sounds developed from the electroacoustic transducer means can be interrupted when not desired.

25. Electronic circuit test equipment as defined in claim 20 further comprising a first gate means having an output, a pair of inputs interconnected to said detecting means output and said first detected signal converting means, respectively, and a second gate means having an output, a pair of inputs connected to the output of said first gate means and said second detected signal converting means, respectively, the output of said second gate means being connected to said switching circuit.

26. Electronic circuit test equipment as defined in claim 20 further comprising, OR gate means having an output terminal and a pair of inputs coupled to the outputs of said detecting means, respectively, said OR gate controlling energization and de-energization of said electroacoustic transducer means in accordance with the condition as to whether or not said probe is in contact with the logic circuit under test.

27. Electronic circuit test equipment as defined in claim 26 further comprising, AND gate means having an output, a first input coupled to said oscillator means, a second input coupled to the output of said OR gate means, so that the output of said oscillator means appears at said AND gate means output at the time of the presence of an electrical signal detected by said detecting means.

28. Electronic circuit test equipment as defined in claim 27 further comprising a switching means interposed between said detecting means and said AND gate means in such a manner that the flow of the sensed electrical signals into said detecting means is controlled by manually operating said switching means, whereby the oscillation sounds developed from said electroacoustic transducer means can be interrupted when not desired.

29. Electronic circuit test equipment as defined in claim 20 further comprising a probe housing for supporting said probe, and indicating means disposed within said probe housing and connected to said detecting means to indicate said electrical conditions in the logic circuit under test.

30. Electronic circuit test equipment as defined in claim 29 further comprising manual switching means for manually switching between energization and de-energization of said indicating means.

31. Electronic circuit test equipment as defined in claim 29 wherein said indicating means comprises a first indicating means and a second indicating means adapted to identify the first and the second levels of the logic electrical signals, respectively, said two indicating means are connected to said first and second stages of the detecting means, respectively.

32. Electrical circuit test equipment as defined in claim 31 wherein said probe is provided with color codes having a plurality of colors corresponding to the lights emitted from said two indicating means, whereby a duty cycle or a pulse train can be measured according to said color codes.

33. Electrical circuit test equipment as defined in claim 26 further comprising indicating means to be energized by the output of said OR gate means.

34. Electronic circuit test equipment as defined in claim 33 further comprising a manually operable switch mounted on said probe and connected to said indicating means to permit control of the energization and deenergization of said indicating means.

* * * * *

UNITED STATES PATENT OFFICE
CERTIFICATE OF CORRECTION

Patent No. 3,903,471  Dated September 2, 1975

Inventor(s) RYOZO HIRAGA, ET AL.

It is certified that error appears in the above-identified patent and that said Letters Patent are hereby corrected as shown below:

On the Title Page, in the Abstract, line 1, "in" should read --is--;

Column 1, line 47, "precedure" should read --procedure--;

Column 2, line 27, "heared" should read --heard--;

Column 2, line 50, "a first" should read --first--;

Column 3, line 14, "shownn" should read --shown--;

Column 3, line 47, "trigger" should read --triggered--;

Column 3, line 58, "inventer" should read --inverter--;

Column 4, line 36, "During the NAND circuit" should read --When the NAND circuit--;

Column 4, line 37, "that is during when" should read --that is, during the time when--;

Signed and Sealed this thirtieth Day of December 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,903,471      Dated September 2, 1975

Inventor(s)    RYOZO HIRAGA, ET AL.      Page - 2 -

It is certified that error appears in the above-identified patent and that said Letters Patent are hereby corrected as shown below:

Column 4, line 61, "is opened." should read --is closed.--;

Column 5, line 28, "circuti" should read --circuit--;

Column 5, line 47, "FIG. 1" should read --FIG. 1.--;

Column 7, line 45, "ciucuit" should read --circuit--;

Column 8, line 18, "FIG. 12 and 13" should read --FIGS. 12 and 13--;

Column 8, line 40, "versatality" should read --versatility--;

Column 8, line 57, "within installed in" should read --installed within--;

Column 9, line 27, "level" should read --level,--; "ligth" should read --light,--;

Column 9, line 28, "level" (second occurrence) should read --level,--;

Column 10, line 46, "equipments" should read --equipment--;

UNITED STATES PATENT OFFICE
CERTIFICATE OF CORRECTION

Patent No. 3,903,471  Dated September 2, 1975

Inventor(s) RYOZO HIRAGA, ET AL.  Page - 3 -

It is certified that error appears in the above-identified patent and that said Letters Patent are hereby corrected as shown below:

Column 10, line 50, "see" should read --sees--;

Column 10, line 68, "are" should read --is--;

Column 11, line 61, "arithematic" should read --arithmetic--;

Column 12, lines 60 and 61, "overcomed" should read --overcome--

Column 13, line 20, "by a single test equipment" should read --by a single piece of test equipment--;

Column 13, lines 22 and 23, "in a low- and high-level voltage comparators" should read --in low- and high-level voltage comparators--;

Column 13, lines 24 and 25, "a low- and high-level comparators" should read --low- and high-level comparators--;

Column 13, line 51, "a power" should read --to a power--.

Signed and Sealed this thirtieth Day of December 1975

[SEAL]

Attest:

RUTH C. MASON  
Attesting Officer

C. MARSHALL DANN  
Commissioner of Patents and Trademarks